US006415360B1

(12) United States Patent
Hughes et al.

(10) Patent No.: US 6,415,360 B1
(45) Date of Patent: Jul. 2, 2002

(54) MINIMIZING SELF-MODIFYING CODE CHECKS FOR UNCACHEABLE MEMORY TYPES

(75) Inventors: William Alexander Hughes, Burlingame, CA (US); William Kurt Lewchuk; Gerald D. Zuraski, Jr., both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/314,066

(22) Filed: May 18, 1999

(51) Int. Cl.[7] .......... G06F 12/00
(52) U.S. Cl. .......... 711/139; 711/138
(58) Field of Search .......... 711/138, 139, 711/118, 125, 126

(56) References Cited

U.S. PATENT DOCUMENTS

| | | | | |
|---|---|---|---|---|
| 5,276,828 A | | 1/1994 | Dion | |
| 5,440,752 A | | 8/1995 | Lentz et al. | |
| 5,487,156 A | | 1/1996 | Popescu et al. | |
| 5,490,259 A | | 2/1996 | Hiraoka et al. | |
| 5,557,763 A | | 9/1996 | Senter et al. | |
| 5,625,835 A | | 4/1997 | Ebcioglu et al. | |
| 5,652,859 A | | 7/1997 | Mulla et al. | |
| 5,742,791 A | | 4/1998 | Mahalingaiah et al. | |
| 5,751,983 A | | 5/1998 | Abramson et al. | |
| 5,761,712 A | | 6/1998 | Tran et al. | |
| 5,768,555 A | * | 6/1998 | Tran et al. | 395/392 |
| 5,781,790 A | | 7/1998 | Abramson et al. | |
| 5,802,588 A | | 9/1998 | Ramagopal et al. | |
| 5,832,297 A | | 11/1998 | Ramagopal et al. | |
| 5,887,152 A | * | 3/1999 | Tran | 395/393 |
| 6,122,715 A | * | 9/2000 | Palanca et al. | 711/154 |

FOREIGN PATENT DOCUMENTS

| | | |
|---|---|---|
| GB | 2 281 422 | 3/1995 |
| WO | 96/12227 | 4/1996 |

OTHER PUBLICATIONS

Leibholz et al., "The Alpha 21264: A 500 MHz Out–of–Order Execution Microprocessor," ©1997 IEEE, pp. 28–36.

* cited by examiner

*Primary Examiner*—Matthew Kim
*Assistant Examiner*—Pierre M. Vital
(74) *Attorney, Agent, or Firm*—Conley, Rose & Tayon, PC; Lawrence J. Merkel

(57) ABSTRACT

A processor employs an SMC check apparatus. The SMC check apparatus may minimize the number of explicit SMC checks performed for non-cacheable stores. Cacheable stores may be handled using any suitable mechanism. For non-cacheable stores, the processor tracks whether or not the in-flight instructions are cached. Upon encountering a non-cacheable store, the processor inhibits an SMC check if the in-flight instructions are cached. Since, for performance reasons, the code stream is often cached, non-cacheable stores may frequently be able to skip an explicit, complex, and time consuming SMC check. Performance of non-cacheable stores (and memory throughput overall) may be increased. The handling of non-cacheable stores as described herein may be particularly beneficial to video data manipulations, which may frequently be of a non-cacheable memory type and which may be important to the overall performance of a computer system.

35 Claims, 17 Drawing Sheets

MINIMIZING SELF-MODIFYING CODE CHECKS FOR UNCACHEABLE MEMORY TYPES

BACKGROUND OF THE INVENTION

1. Field of the Invention

This invention is related to the field of processors and, more particularly, to load/store units within processors.

2. Description of the Related Art

Processors are more and more being designed using techniques to increase the number of instructions executed per second. Superscalar techniques involve providing multiple execution units and attempting to execute multiple instructions in parallel. Pipelining, or superpipelining, techniques involve overlapping the execution of different instructions using pipeline stages. Each stage performs a portion of the instruction execution process (involving fetch, decode, execution, and result commit, among others), and passes the instruction on to the next stage. While each instruction still executes in the same amount of time, the overlapping of instruction execution allows for the effective execution rate to be higher. Typical processors employ a combination of these techniques and others to increase the instruction execution rate.

As processors employ wider superscalar configurations and/or deeper instruction pipelines, memory latency becomes an even larger issue than it was previously. While virtually all modem processors employ one or more caches to decrease memory latency, even access to these caches is beginning to impact performance.

More particularly, as processors allow larger numbers of instructions to be in-flight within the processors, the number of load and store memory operations which are in-flight increases as well. As used here, an instruction is "in-flight" if the instruction has been fetched into the instruction pipeline (either speculatively or non-speculatively) but has not yet completed execution by committing its results (either to architected registers or memory locations). Additionally, the term "memory operation" is an operation which specifies a transfer of data between a processor and memory (although the transfer may be accomplished in cache). Load memory operations specify a transfer of data from memory to the processor, and store memory operations specify a transfer of data from the processor to memory. Load memory operations may be referred to herein more succinctly as "loads", and similarly store memory operations may be referred to as "stores". Memory operations may be implicit within an instruction which directly accesses a memory operand to perform its defined function (e.g. arithmetic, logic, etc.), or may be an explicit instruction which performs the data transfer only, depending upon the instruction set employed by the processor. Generally, memory operations specify the affected memory location via an address generated from one or more operands of the memory operation. This address will be referred to herein in as a "data address" generally, or a load address (when the corresponding memory operation is a load) or a store address (when the corresponding memory operation is a store). On the other hand, addresses which locate the instructions themselves within memory are referred to as "instruction addresses".

Since memory operations are part of the instruction stream, having more instructions in-flight leads to having more memory operations in-flight. Unfortunately, adding additional ports to the data cache to allow more operations to occur in parallel is generally not feasible beyond a few ports (e.g. 2) due to increases in both cache access time and area occupied by the data cache circuitry. Accordingly, relatively larger buffers for memory operations are often employed. Scanning these buffers for memory operations to access the data cache is generally complex and, accordingly, slow. The scanning may substantially impact the load memory operation latency, even for cache hits.

Additionally, data caches are finite storage for which some load and stores will miss. A memory operation is a "hit" in a cache if the data accessed by the memory operation is stored in cache at the time of access, and is a "miss" if the data accessed by the memory operation is not stored in cache at the time of access. When a load memory operation misses a data cache, the data is typically loaded into the cache. Store memory operations which miss the data cache may or may no t cause the data to be loaded into the cache. Data is stored in caches in units referred to as "cache lines", which are the minimum number of contiguous bytes to be allocated and deallocated storage within the cache. Since many memory operations are being attempted, it becomes more likely that numerous cache misses will be experienced. Furthermore, in many common cases, one miss within a cache line may rapidly be followed by a large number of additional misses to that cache line. These misses may fill, or c come close e to filling, the buffers allocated within the processor for memory operations. An efficient scheme for buffering memory operations is therefore needed.

An additional problem which become s even more onerous as processors employ wider superscalar configurations and/or deeper pipelines is the issue of self-modifying code (SMC) checks. Self-modifying code is code which performs store memory operations to memory locations which are subsequently fetched as instructions to be executed. Pipelined and/or wide issue processors may have fetched numerous instructions subsequent to the stores and hence may have fetched from the memory locations being stored to prior to the store being performed. In order to operate correctly, the store data must be fetched as the instructions from the updated memory locations. Accordingly, SMC checks are performed for stores to determine if one or more instructions updated by the store have been fetched prior to completion of the store, so that corrective action may be taken to fetch the correct instructions. As the number of instructions in-flight within processors increase, the difficulty in performing SMC checks (and hence the amount of time these checks may take) increases. Additionally, the likelihood that a n SMC check will indicate that the subsequent instructions have been fetched when self-modifying code is executing is increased. A mechanism which minimizes the number of explicit SMC checks which are performed but which still guarantees correct self-modifying code execution is therefore desired.

SUMMARY OF THE INVENTION

The problems outlined above are in large part solved by processor employing an SMC check apparatus as described herein. The SMC check apparatus may minimize the number of explicit SMC checks performed for non-cacheable stores. Cacheable stores may be handled using any suitable mechanism. For non-cacheable stores, the processor tracks whether or not the in-flight instructions are cached. Upon encountering a non-cacheable store, the processor inhibits an SMC check if the in-flight instructions are cached. Since, for performance reasons, the code stream is often cached, non-cacheable stores may frequently be able to skip an explicit, complex, and time consuming SMC check. Performance of non-cacheable stores (and memory throughput overall) may be increased. The handling of non-cacheable stores as described herein may be particularly beneficial to video data manipulations, which may frequently be of a non-cacheable memory type and which may be important to the overall performance of a computer system.

Broadly speaking, a processor is contemplated comprising a load/store unit. The load/store unit includes a buffer and a control logic. The buffer is configured to store a store memory operation and a corresponding cacheability indication. The control logic is configured to set the cacheability indication according to a translation of a store address corresponding to the store memory operation. The control logic is coupled to receive a signal indicative of whether one or more instructions in-flight within the processor are uncacheable. The control logic is configured to inhibit a self-modifying code (SMC) check for the store memory operation responsive to: (i) the cacheability indication indicating non-cacheable; and (ii) the signal indicating cacheable. A computer system is also contemplated including the processor and an input/output (I/O) device. The I/O device provides communication between the computer system and another computer system to which the I/O device is coupled.

Additionally, a method for performing self-modifying code (SMC) checks in a processor is contemplated. The method determines that a store memory operation is non-cacheable. A signal is asserted if one or more instructions in-flight within the processor are non-cacheable. An SMC check for the store memory operation is inhibited if the store memory operation is non-cacheable and the signal is deasserted.

BRIEF DESCRIPTION OF THE DRAWINGS

Other objects and advantages of the invention will become apparent upon reading the following detailed description and upon reference to the accompanying drawings in which.

Figure 1:
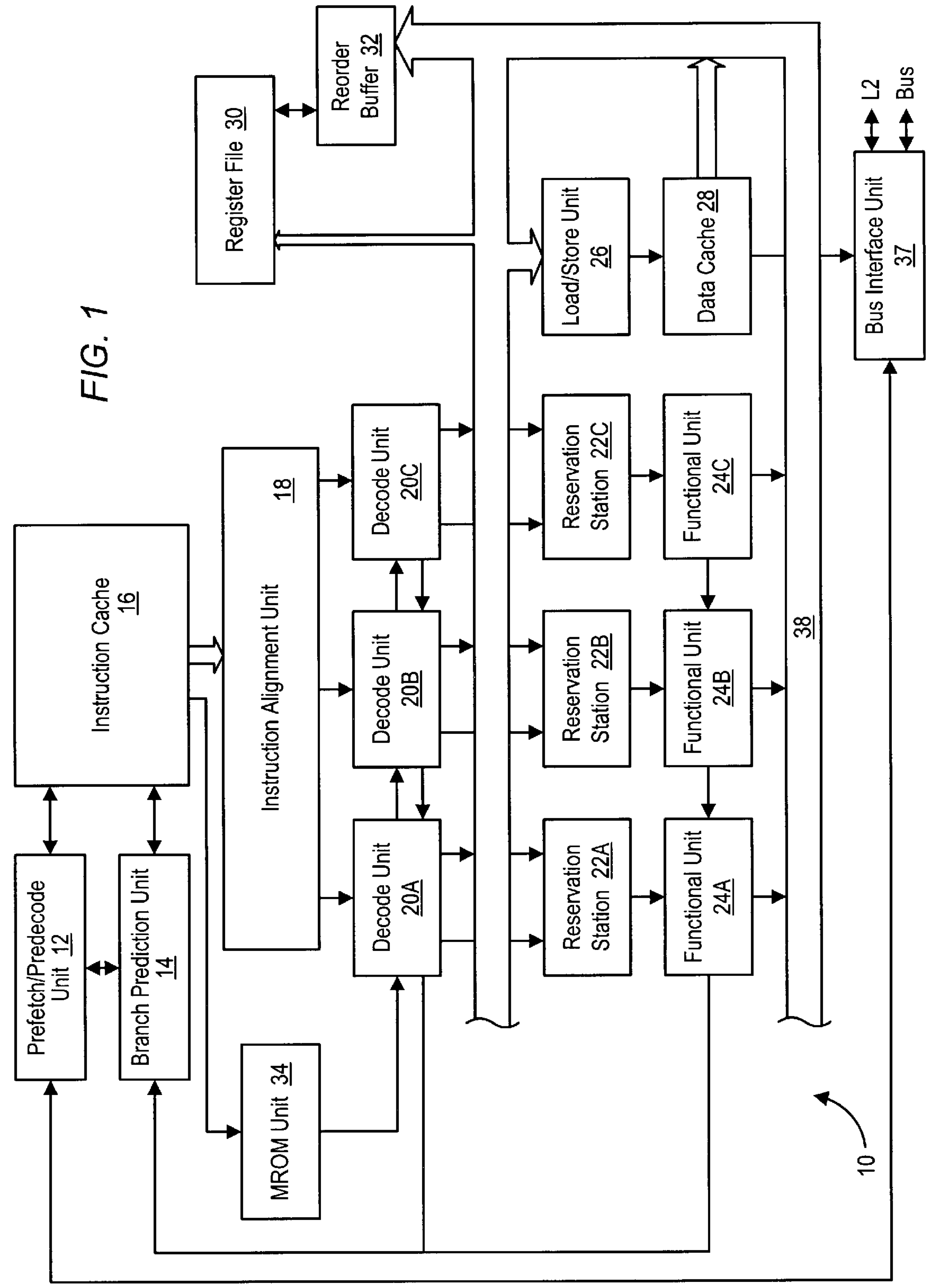
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 32 byte lines (a byte comprises 8 binary bits). Alternatively, any other desired configuration and size may be employed. For example, it is noted that instruction cache 16 may be implemented as a filly associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional nit 24B; and issue position 2 is formed by reservation station 22C and functional unit 4C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor I/O which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred o as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bidirectional links, etc. An optional L2 cache interface may be employed as well for interfacing to a level two cache.

Load/Store Unit

Figure 2:
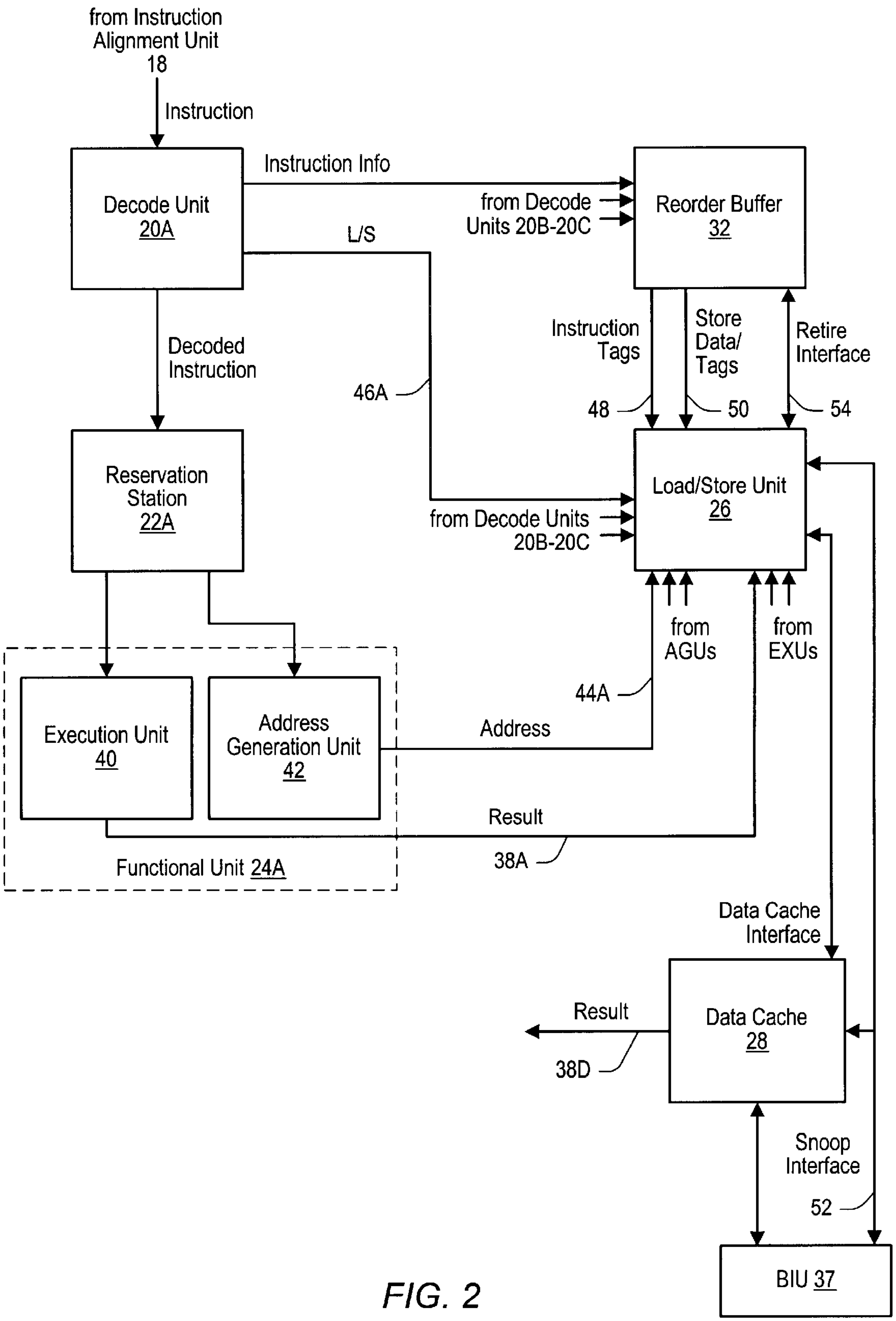
FIG. 2 is a block diagram of one embodiment of a decode unit, a reservation station, a functional unit, a reorder buffer, a load/store unit, a data cache, and a bus interface unit shown in FIG. 1.

A more detailed discussion of one embodiment of load/store unit 26 is next provided. Other embodiments are possible and contemplated. FIG. 2 illustrates load/store unit 26, reorder buffer 32, data cache 28, bus interface unit (BIU) 37, decode unit 20A, reservation station 22A, and functional unit 24A to highlight certain interconnection therebetween according to one embodiment of processor 10. Other embodiments may employ additional, alternative, or substitute interconnect as desired. Interconnect between decode units 20B–20C, reservation stations 22B–22C, functional units 24B–24C, and other units shown in FIG. 2 may be similar to that shown in FIG. 2.

Decode unit 20A receives an instruction from instruction alignment unit 18 and decodes the instruction. Decode unit 20A provides the decoded instruction to reservation station 22A, which stores the decoded instruction until the instruction is selected for execution. Additionally, if the instruction specifies a load or store memory operation, decode unit 20A signals load/store unit 26 via L/S lines 46A. Similar signals from decode units 20B–20C may be received by load/store unit 26 as well. L/S lines 46A indicate whether a load memory operation, a store memory operation, or both are specified by the instruction being decoded. For example, L/S lines 46A may comprise a load line and a store line. If no memory operation is specified, then signals on both lines are deasserted. The signal on the load line is asserted if a load memory operation is specified, and similarly the signal on the store line is asserted if a store memory operation is specified. Both signals are asserted if both a load memory operation and a store memory operation are specified. In response to signals on L/S lines 46A, load/store unit 26 allocates an entry in a load/store buffer included therein to store the corresponding memory operation.

In addition to the above, decode unit 20A provides information to reorder buffer 32 about the instruction being decoded. Reorder buffer 32 receives the information (as well as similar information from other decode units 20B–20C) and allocates reorder buffer entries in response thereto. The allocated reorder buffer entries are identified by reorder buffer tags, which are transmitted to load/store unit 26 upon an instruction tags bus 48. Instruction tags bus 48 may be configured to transmit a tag for each possible instruction (e.g. three in the present embodiment, one from each of decode units 20A–20C). Alternatively, in an embodiment employing the line-oriented structure described above, reorder buffer 32 may be configured to transmit a line tag for the line, and load/store unit 26 may augment the line tag with the offset tag of the issue position which is signalling a particular load or store.

Reorder buffer 32 is further configured to perform dependency checking for register operands of the instruction. The register operands are identified in the instruction information transmitted by decode units 20. For store memory operations, the store data is a source operand which load/store unit 26 receives in addition to the store address. Accordingly, reorder buffer 32 determines the instruction which generates the store data for each store memory operation and conveys either the store data (if it is available within reorder buffer 32 or register file 30 upon dispatch of the store memory operation) or a store data tag for the store data on a store data/tags bus 50. If the instruction corresponding to the store memory operation is an explicit store instruction which stores the contents of a register to memory, the instruction tag of the instruction which generates the store data (or the store data, if it is available) is conveyed. On the other hand, the instruction itself generates the store data if the instruction includes the store memory operation as an implicit operation. In such cases, reorder buffer 32 provides the instruction tag of the instruction as the store data tag.

Although not illustrated in FIG. 2 for simplicity in the drawing, reservation station 22A receives operand tags and/or data for the instruction from reorder buffer 32 as well. Reservation station 22A captures the operand tags and/or data and awaits delivery of any remaining operand data (identified by the operand tags) from result buses 38. Once an instruction has received its operands, it is eligible for execution by functional unit 24A. More particularly, in the embodiment shown, functional unit 24A includes an execution unit (EXU) 40 and an address generation unit (AGU) 42. Execution unit 40 performs instruction operations (e.g. arithmetic and logic operations) to generate results which are forwarded on result bus 38A (one of result buses 38) to load/store unit 26, reservation stations 22, and reorder buffer 32. AGU 42 generates data addresses for use by a memory operation or operations specified by the instruction, and transmits the data addresses to load/store unit 26 via address bus 44A. It is noted that other embodiments may be employed in which AGU 42 and execution unit 40 share result bus 38A and in which functional unit 24A includes only an execution unit which performs address generation and other instruction execution operations. Load/store unit 26 is further coupled to receive result buses and address buses from the execution units and AGUs within other functional units 24B–24C as well.

Since the embodiment shown employs AGU 42, reservation station 22A may select the address generation portion of an instruction for execution by AGU 42 once the operands used to form the address have been received but prior to receiving any additional operands the instruction may have. AGU 42 transmits the generated address to load/store unit 26 on address bus 44A, along with the instruction tag of the instruction for which the data address is generated. Accordingly, load/store unit 26 may compare the tag received on address bus 44A to the instruction tags stored in the load/store buffer to determine which load or store the data address corresponds to.

Load/store unit 26 monitors the result tags provided on result buses 38 to capture store data for store memory operations. If the result tags match a store data tag within load/store unit 26, load/store unit 26 captures the corresponding data and associates the data with the corresponding store instruction.

Load/store unit 26 is coupled to data cache 28 via a data cache interface. Load/store unit 26 selects memory operations to probe data cache 28 via the data cache interface, and receives probe results from the data cache interface. Generally speaking, a "probe" of the data cache for a particular memory operation comprises transmitting the data address of the particular memory operation to data cache 28 for data cache 28 to determine if the data address hits therein. Data cache 28 returns a probe result (e.g. a hit/miss indication) to load/store unit 26. In addition, if the particular memory operation is a load and hits, data cache 28 forwards the corresponding load data on a result bus 38D to reservation stations 22, reorder buffer 32, and load/store unit 26. In one embodiment, data cache 28 includes two ports and may thus receive up to 2 probes concurrently. Data cache 28 may, for example, employ a banked configuration in which cache lines are stored across at least two banks and two probes may be serviced concurrently as long as they access different banks. In one particular embodiment, data cache 28 may employ 8 banks. Various embodiments of the data cache interface are described in further detail below.

Data cache 28 is configured to allocate cache lines in response to probes that miss, and communicates with bus interface unit 37 to fetch the missing cache lines. Additionally, data cache 28 transmits evicted cache lines which have been modified to bus interface unit 37 for updating main memory.

Bus interface unit 37 is coupled to data cache 28 and load/store unit 26 via a snoop interface 52 as well. Snoop interface 52 may be used by bus interface unit 37 to determine if coherency activity needs to be performed in response to a snoop operation received from the bus. Generally, a "snoop operation" is an operation performed upon a bus for the purpose of maintaining memory coherency with respect to caches connected to the bus (e.g. within processors). When coherency is properly maintained, a copy of data corresponding to a particular memory location and stored in one of the caches is consistent with the copies stored in each other cache. The snoop operation may be an explicit operation, or may be an implicit part of an operation performed to the address of the particular memory location. Generally, the snoop operation specifies the address to be snooped (the "snoop address") and the desired state of the cache line if the address is stored in the cache. Bus interface unit transmits a snoop request via snoop interface 52 to data cache 28 and load/store unit 26 to perform the snoop operation.

Reorder buffer 32 manages the retirement of instructions. Reorder buffer 32 communicates with load/store unit 26 via retire interface 54 to identify instructions either being retired or ready for retirement. For example, in one embodiment stores do not update data cache 28 (or main memory) until they are retired. Additionally, certain load instruction may be restricted to be performed non-speculatively. Reorder buffer 32 may indicate memory operations which are retired or retireable to load/store unit 26 via retirement interface 54. Accordingly, the instruction information provided by decode units 20 to reorder buffer 32 for each instruction may include an indication of whether or not the instruction includes a load or store operation. Load/store unit 26 may return an acknowledgment to reorder buffer 32 that a particular memory operation is logged as retired, and reorder buffer 32 may subsequently retire the corresponding instruction.

Since the load/store buffer may become full at times, load/store unit 26 may employ a flow control mechanism to stall subsequent memory operations at decode units 20 until sufficient entries are freed (via completion of earlier memory operations) within the load/store buffer for the subsequent memory operations. For example, load/store unit 26 may broadcast a count of the number of free entries to decode units 20, which may stall if the count indicates that insufficient entries are available for the memory operations of instructions being decoded. According to one particular embodiment, the instructions being concurrently decoded by decode units 20 move to reservation stations 22 in lockstep (so that a line may be allocated in reorder buffer 32 for the instructions, as described above with respect to FIG. 1). In such an embodiment, decode units 20 may stall until sufficient entries are available for all memory operations within the set of concurrently decoded instructions. Alternatively, load/store unit 26 may employ a stall signal for stalling subsequent memory operations until buffer entries are available. Any suitable flow control mechanism may be used.

Figure 3:
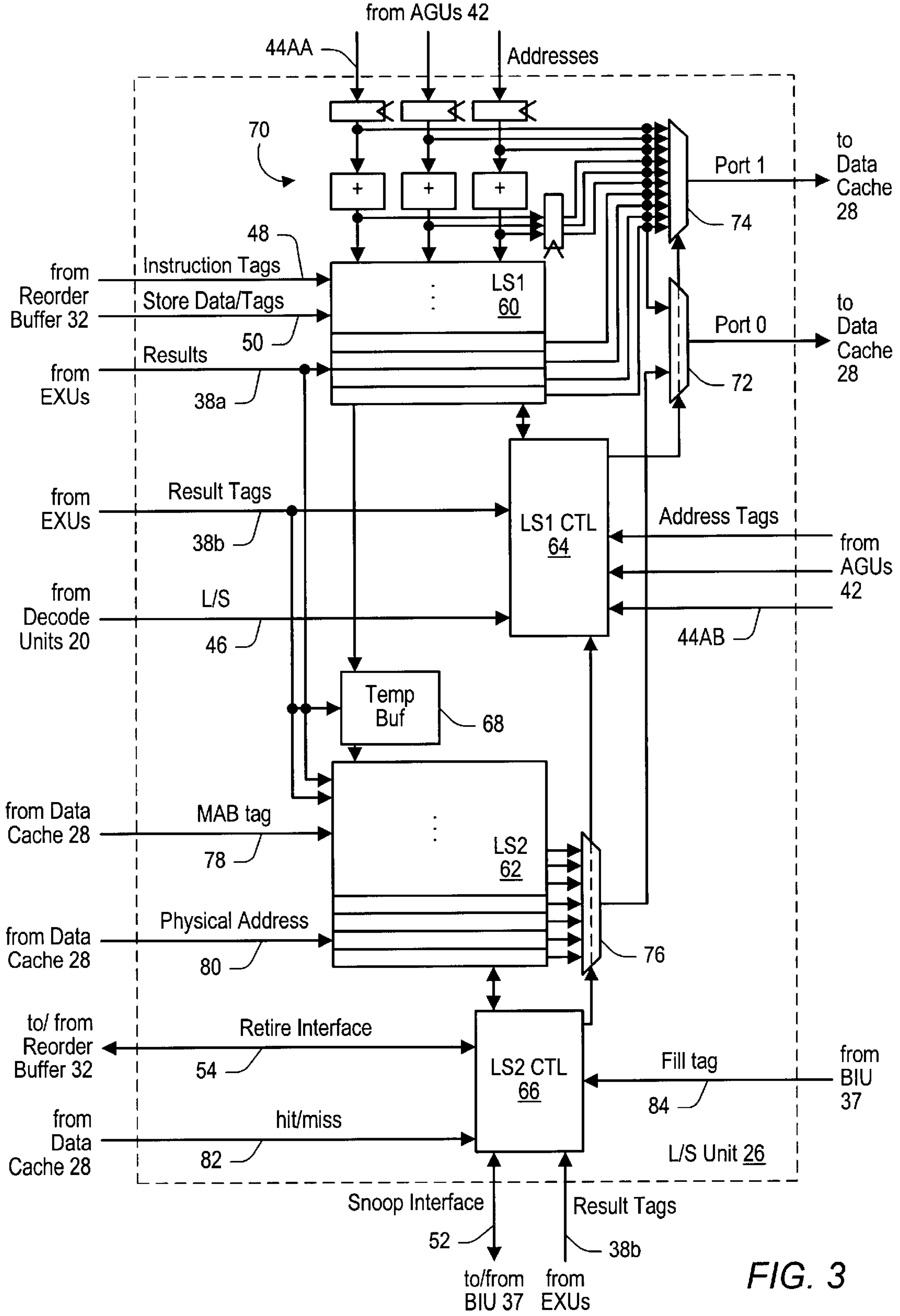
FIG. 3 is a block diagram of one embodiment of a load/store unit.

Turning now to FIG. 3, a block diagram of one embodiment of load/store unit 26 is shown. Other embodiments are possible and contemplated. In the embodiment of FIG. 3, load/store unit 26 includes a first load/store buffer (LS1 buffer) 60, a second load/store buffer (LS2 buffer) 62, an LS1 control logic 64, an LS2 control logic 66, a temporary buffer 68, segment adders 70, a port 0 multiplexor (mux) 72, a port 1 mux 74, and an LS2 reprobe mux 76. Segment adders 70 are coupled to receive data addresses from AGUs 42 within functional units 24A–24C (e.g. address bus 44AA, part of address bus 44A shown in FIG. 2, conveys the data address from AGU 42 within functional unit 24A). Muxes 70 and 72 are coupled to receive the data addresses from AGUs 42 and the outputs of segment adders 70, as well as being coupled to LS 1 buffer 60. Mux 72 also receives an input from LS2 reprobe mux 76. Furthermore, LS 1 buffer 60 is coupled to segment adders 70, LS 1 control logic 64, temporary buffer 68, instruction tags bus 48, store data/tags bus 50, and results buses 38*a* (the result data portion of result buses 38). LS1 control logic 64 is coupled to muxes 72 and 74 and to LS2 control logic 66. Furthermore, LS 1 control logic 64 is coupled to receive address tags from AGUs 42 (e.g. address tag bus 44AB, part of address tag bus 44A shown in FIG. 2, conveys the address tag from AGU 42 within functional unit 24A), result tags via result tags buses 38*b* (the result tag portion of result buses 38), and L/S lines 46 (including L/S lines 46A from decode unit 20A). Temporary buffer 68 and LS2 buffer 62 are coupled to results buses 38*a* and result tags buses 38*b*. LS2 buffer 62 is further coupled to receive a miss address buffer (MAB) tag on a MAB tag bus 78 and a physical address on a physical address bus 80 from data cache 28. LS2 buffer 62 is still further coupled to mux 76, LS2 control logic 66, and temporary buffer 68. LS2 control logic 66 is further coupled to mux 76, retire interface 54, result tags buses 38*b*, snoop interface 52, hit/miss signals 82 from data cache 28, and a fill tag bus 84 from bus interface unit 37.

Generally speaking, load/store unit 26 includes a pre-cache buffer (LS 1 buffer 60) and a post-cache buffer (LS2 buffer 62). Memory operations are allocated into LS1 buffer 60 upon dispatch within processor 10, and remain within LS1 buffer 60 until selected to probe data cache 28. Subsequent to probing data cache 28, the memory operations are moved to LS2 buffer 62 independent of the probe status (e.g. hit/miss, etc.). Since LS1 buffer 60 stores memory operations which have yet to probe data cache 28 and the memory operations are removed from LS1 buffer 60 upon probing data cache 28, a relatively simple scanning scheme may be used to select memory operations to probe data cache 28. Since the scheme is simple, it may be performed rapidly and may aid in keeping load latency low for loads which hit data cache 28. Additionally, since memory operations are deleted from LS1 after probing data cache 28, the size (i.e. number of entries) of LS1 buffer 60 may be relatively small as compared to the total number of memory operations which may be in-flight.

Memory operations which miss may subsequently be selected through LS2 reprobe mux 76 and port 0 mux 72 to reprobe data cache 28. The term "reprobe", as used herein, refers to probing a cache for a second or subsequent attempt after the first probe for a particular memory operation. Additionally, store memory operations may be held in LS2 buffer 62 until the stores are in condition for retirement. LS2 buffer 62 may be made deeper than LS1 buffer 60, allowing for large numbers of misses to be stored therein. Since, in many cases, memory operations accessing the same cache line tend to be near each other in an instruction stream, a relatively large number of misses to the same cache line may be queued in LS2 buffer 62. Subsequent memory operations which hit data cache 28 may then be selected from LS1 buffer 60 and serviced. Average cache bandwidth may thereby be increased. Furthermore, by allowing the queuing of numerous cache misses in LS2, it may be possible in many cases to keep bus interface unit 37 busy servicing numerous cache line fetch requests from data cache 28, thereby maximizing use of external bus bandwidth.

In response to signals on L/S lines 46, LS1 control logic 64 allocates entries within LS1 buffer 60 to the identified load and store memory operations. The respective instruction tags and store data/tags (if applicable) are received into the allocated entries by LS1 buffer 60 under the control of LS1 control logic 64. Subsequently, the corresponding data addresses are received from the AGUs (identified by the address tags received by LS1 control logic 64) and are stored into the allocated entries.

A memory operation which has received its address becomes eligible to probe data cache 28. LS1 control logic 64 scans the LS1 buffer entries for memory operations to probe data cache 28, and generates selection controls for port 0 mux 72 and port 1 mux 74. Accordingly, up to two memory operations may probe data cache 28 per clock cycle in the illustrated embodiment. According to one particular implementation, LS1 control logic 64 selects memory operations for probing data cache 28 in program order. Accordingly, LS1 control logic 64 may be configured to limit scanning to the oldest memory operations within LS1 buffer 60. The "program order" of the memory operations is the order the instructions would be executed in if the instructions were fetched and executed one at a time. Furthermore, the program order of instructions speculatively fetched (according to branch predictions, for example) is the order the instructions would be executed in as stated above under the assumption that the speculation is correct. Instructions which are prior to other instructions in the program order are said to be older than the other instructions. Conversely, instructions which are subsequent to other instructions in program order are said to be younger than the other instructions. It is noted that other implementations may select memory operations to probe data cache 28 out of order, as desired.

LS1 control logic 64 is configured to select a memory operation to probe data cache 28 as the data address is received (provided, in the present embodiment, that the memory operation is within an entry being scanned by LS1 control logic 64). If the address tags received from the AGUs 42 match an instruction tag of an otherwise selectable memory operation, LS1 control logic 64 selects the corresponding data address received from the AGU 42 via one of muxes 72 and 74.

While the data address may be selected for probing as it is provided to load/store unit 26, the data address is also provided to one of segment adders 70. Segment adders 70 are included in the present embodiment to handle the segmentation portion of the x86 addressing scheme. Embodiments which do not employ the x86 instruction set architecture may eliminate segment adders 70. Generally, AGUs 42 generate a virtual address corresponding to the memory operation. The virtual address is the address generated by adding the address operands of an instruction. The virtual address is translated through an address translation mechanism specified by the instruction set architecture employed by processor 10 to a physical address. The physical address identifies a memory location within main memory. In the x86 architecture, a two-tiered translation scheme is defined from a logical address (or virtual address) to a linear address through a segmentation scheme and then to the physical address through a paging scheme. Since AGUs 42 add the address operands of the instruction, the data address provided by the AGUs is a logical address. However, modem instruction code is generally employing a "flat addressing mode" in which the segment base addresses (which are added to the logical address to create the linear address) are programmed to zero. Accordingly, load/store unit 26 presumes that the segment base address is zero (and hence the logical and linear addresses are equal) and selects the logical address to probe data cache 28. Segment adders 70 add the segment base address of the selected segment for the memory operation and provide the linear address to muxes 72 and 74 and to LS1 buffer 60 for storage. If the segment base address for a particular memory operation is non-zero and the memory operation was selected to probe data cache 28 upon receiving the logical address, LS1 control logic 64 may cancel the previous access (such that load data is not forwarded) and select the corresponding linear address from the output of the corresponding segment adder 70 for probing data cache 28. In other alternative embodiments, AGUs 42 may receive the segment base address and generate linear addresses. Still other embodiments may require flat addressing mode and segment base addresses may be ignored.

Muxes 72 and 74 are coupled to receive data addresses from entries within LS1 buffer 60 as well. The data address corresponding to a memory operation is stored in the LS1 entry assigned to the memory operation upon receipt from the AGUs 42. The data address is selected from the entry upon selecting the memory operation to probe data cache 28. It is noted that, in addition to the data address, other information may be transmitted to data cache 28 via muxes 70 and 72. For example, an indication of whether the memory operation is a load or store may be conveyed. The instruction tag of the memory operation may be conveyed for forwarding on result buses 38D with the load data for load memory operations. The size of the operation (for muxing out the appropriate data) may be conveyed as well. Any desirable information may be transmitted according to design choice.

Store data may be provided for a store memory operation while the store memory operation resides in LS1 buffer 60. Accordingly, LS1 control logic 64 may monitor result tags buses 38*b*. If a tag matching a store data tag within LS1 buffer 64 is received, the corresponding store data from the corresponding one of result buses 38*a* is captured into the entry having the matching store data tag.

LS1 control logic 64 removes memory operations from LS1 buffer 60 in response to the memory operations probing data cache 28. In one particular embodiment, memory operations are removed the cycle after they are selected for probing data cache 28. The cycle after may be used to allow, in cases in which a memory operation is selected upon generation of the data address by one of AGUs 42, for the data address to propagate into LS1 buffer 60. Other embodiments may chose to remove the memory operations during the cycle that the memory operations are selected. Because the memory operations are removed the cycle after they are selected, LS1 control logic 64 is configured to scan the oldest 4 entries in LS1 buffer 60 to select memory operations for probing data cache 28 (up to two entries selected in the previous clock cycle and up to two entries being selectable in the present clock cycle).

Memory operations removed from LS1 buffer 60 are moved to temporary buffer 68. Temporary buffer 68 may be provided to ease timing constraints in reading entries from LS1 buffer 60 and writing them to LS2 buffer 62. Accordingly, temporary buffer 68 is merely a design convenience and is entirely optional. The clock cycle after a memory operation is moved into temporary buffer 68, it is moved to LS2 buffer 62. Since store data may be received upon results buses 38 during the clock cycle a store memory operation is held in temporary buffer 68, temporary buffer 68 monitors result tags on result tags buses 38*b* and captures data from result buses 38*a* in a manner similar to LS1 buffer 60 capturing the data.

Accordingly, memory operations which have probed data cache 28 are placed into LS2 buffer 62. In the present embodiment, all memory operations are placed into LS2 buffer 62 after an initial probe of data cache 28. Stores are held in LS2 buffer 62 until they can be committed to data cache 28 (i.e. until they are allowed to update data cache 28). In general, stores may be committed when they become non-speculative. In one embodiment, stores may be committed in response to their retirement (as indicated via retirement interface 54) or at any time thereafter. Loads are held in LS2 buffer 62 until they retire as well in the present embodiment. Load hits remain in LS2 buffer 62 for snooping purposes. Load misses are held in LS2 at least until the cache line accessed by the load is being transferred into data cache 28. In response to the cache line (or portion thereof including the load data) being scheduled for updating the cache, the load miss is scheduled for reprobing data cache 28. Upon reprobing, the load miss becomes a load hit (and the load data is forwarded by data cache 28) and is retained as such until retiring.

LS2 control logic 66 allocates entries within LS2 buffer 62 for memory operations which have probed data cache 28. Additionally, LS2 control logic 66 receives probe status information from data cache 28 for each of the probes on hit/miss signals 82. The hit/miss information is stored in the LS2 buffer entry corresponding to the memory operation for which the probe status is provided. In one embodiment, data cache 28 includes address translation circuitry which, in parallel with access to the data cache, attempts to translate the virtual address to the physical address. If a translation is not available within the address translation circuitry, the probe may be identified as a miss until a translation is established (by searching software managed translation tables in main memory, for example). In one specific implementation, the address translation circuitry within data cache 28 comprises a two level translation lookaside buffer (TLB) structure including a 32 entry level-one TLB and a 4 way set associative, 256 entry level-two TLB.

If the data address of the memory operation is successfully translated by data cache 28, the corresponding physical address is provided on physical address bus 80. LS2 control logic causes the corresponding entry to overwrite the virtual address with the physical address. However, certain virtual address bits may be separately maintained for indexing purposes on reprobes and store data commits for embodiments in which data cache 28 is virtually indexed and physically tagged.

For memory operations which miss data cache 28, data cache 28 allocates an entry in a miss address buffer included therein. The miss address buffer queues miss addresses for transmission to bus interface unit 37, which fetches the addresses from the L2 cache or from main memory. A tag identifying the entry within the miss address buffer (the MAB tag) is provided on MAB tag bus 78 for each memory operation which misses. It is noted that data cache 28 allocates miss address buffer entries on a cache line basis. Accordingly, subsequent misses to the same cache line receive the same MAB tag and do not cause an additional miss address buffer entry to be allocated.

Bus interface unit 37 subsequently fetches the missing cache line and returns the cache line as fill data to data cache 28. Bus interface unit 37 also provides the MAB tag corresponding to the cache line as a fill tag on fill tag bus 84. LS2 control logic 66 compares the fill tag to the MAB tags within LS2 buffer 62. If a match on the MAB tag occurs for a load memory operation, then that load may be selected for reprobing data cache 28. If more than one match is detected, the oldest matching load may be selected with other memory operations selected during subsequent clock cycles. Stores which match the MAB tag are marked as hits, but wait to become non-speculative before attempting to commit data.

In one embodiment, the cache line of data is returned using multiple packets. Each load memory operation may record which packet it accesses (or the packet may be discerned from the appropriate address bits of the load address), and bus interface unit 37 may identify the packet being returned along with the fill tag. Accordingly, only those loads which access the packet being returned may be selected for reprobing.

Bus interface unit 37 provides the fill tag in advance of the fill data to allow a load to be selected for reprobing and to be transmitted to data cache 28 via port 0 to arrive at the data forwarding stage concurrent with the packet of data reaching data cache 28. The accessed data may then be forwarded.

Since stores are moved to LS2 buffer 62 after probing data cache 28 and subsequent loads are allowed to probe data cache 28 from LS1 buffer 60 and forward data therefrom, it is possible that a younger load accessing the same memory location as an older store will probe data cache 28 prior to the older store committing its data to data cache 28. The correct result of the load is to receive the store data corresponding to the older store. Accordingly, LS2 control logic 66 monitors the probe addresses and determines if older stores to those addresses are within LS2 buffer 62. If a match is detected and the store data is available within LS2 buffer 62, LS2 control logic 66 signals data cache 28 to select data provided from LS2 buffer 62 for forwarding and provides the selected data. On the other hand, if a match is detected and the store data is not available within LS2 buffer 62, forwarding of data from data cache 28 is cancelled. The load is moved into LS2 buffer 62, and is selected for reprobing until the store data becomes available. Additional details regarding store to load forwarding are provided further below.

Generally, LS2 control logic 66 is configured to scan the entries within LS2 buffer 62 and select memory operations to reprobe data cache 28. Load misses are selected to reprobe in response to the data being returned to data cache 28. Loads which hit older stores are selected to reprobe if they are not currently reprobing. Stores are selected to reprobe in response to being retired. If multiple memory operations are selectable, LS2 control logic 66 may select the oldest one of the multiple memory operations. If LS2 control logic 66 is using port 0 (via port 0 mux 72), LS2 control logic 66 signals LS1 control logic 64, which selects the LS2 input through port 0 mux 72 and disables selecting a memory operation from LS1 buffer 60 on port 0 for that clock cycle.

LS2 control logic 66 is further coupled to receive snoop requests from bus interface unit 37 via snoop interface 52. Generally, memory operations in LS2 buffer 62 are snooped since they have probed data cache 28 and hence may need corrective action in response to the snoop operation. For example, load hits (which have forwarded data to dependent instructions) may need to be discarded and reexecuted. Stores may be storing a cache state from their probe, which may need to be changed. By contrast, memory operations within LS1 buffer 60 have not probed data cache 28 and thus may not need to be snooped.

LS2 control logic 66 receives the snoop request, examines the LS2 buffer entries against the snoop request, and responds to bus interface unit 37 via snoop interface 52. Additionally, LS2 control logic 66 may perform updates within LS2 buffer entries in response to the snoop. Additional details regarding snooping in LS2 buffer 62 are described below.

Generally speaking, a buffer is a storage element used to store two or more items of information for later retrieval. The buffer may comprise a plurality of registers, latches, flip-flops, or other clocked storage devices. Alternatively, the buffer may comprise a suitably arranged set of random access memory (RAM) cells. The buffer is divided into a number of entries, where each entry is designed to store one item of information for which the buffer is designed. Entries may be allocated and deallocated in any suitable fashion. For example, the buffers may be operated as shifting first-in, first-out (FIFO) buffers in which entries are shifted down as older entries are deleted. Alternatively, head and tail pointers may be used to indicate the oldest and youngest entries in the buffer, and entries may remain in a particular storage location of the buffer until deleted therefrom. The term "control logic" as used herein, refers to any combination of combinatorial logic and/or state machines which performs operations on inputs and generates outputs in response thereto in order to effectuate the operations described.

It is noted that, in one embodiment, load/store unit 26 attempts to overlap store probes from LS1 with the data commit of an older store on the same port. This may be performed because the store probe is only checking the data cache tags for a hit/miss, and is not attempting to retrieve or update data within the data storage. It is further noted that, while the above description refers to an embodiment in which all memory operations are placed in LS2 buffer 62, other embodiments may not operate in this fashion. For example, load hits may not be stored in LS2 buffer 62 in some embodiments. Such embodiments may be employed, for example, if maintaining strong memory ordering is not desired.

Figure 4:
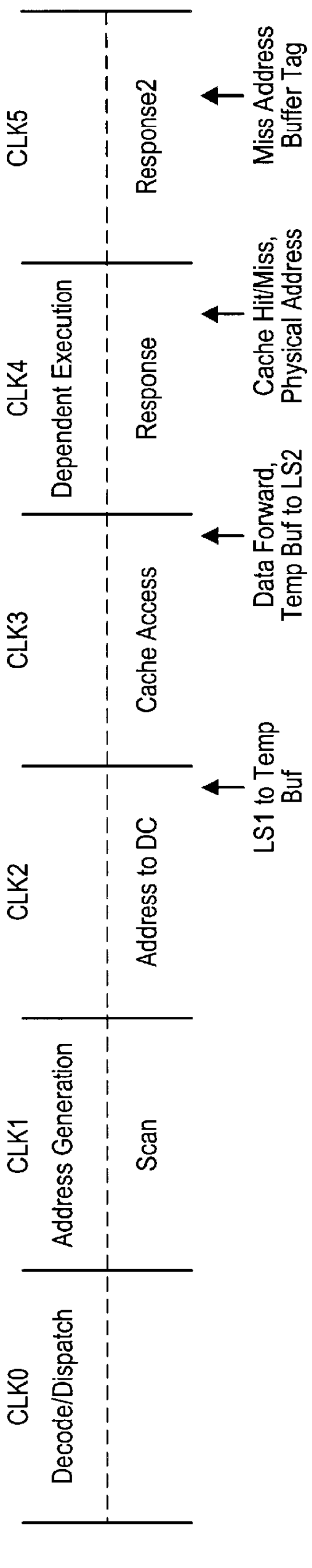
FIG. 4 is a timing diagram illustrating one embodiment of a data cache access pipeline from a first buffer (LS1) illustrated in FIG. 3.

Turning next to FIG. 4, a timing diagram is shown illustrating an exemplary pipeline for a memory operation probing data cache 28 from LS1 buffer 60. Other embodiments employing different pipelines are possible and contemplated. In FIG. 4, clock cycles are delimited by vertical solid lines. A horizontal dashed line is shown as well. Pipeline stages related to other portions of processor 10 are shown to illustrate the interface of other elements to load/store unit 26.

Clock cycle CLK0 is the decode/dispatch cycle for an instruction specifying the memory operation. During clock cycle CLK0, the decode unit 20 decoding the instruction signals load/store unit 26 regarding the memory operation. LS1 control logic 64 allocates an LS1 buffer entry for the memory operation during the decode/dispatch stage for the corresponding instruction. Additionally, the decode unit 20 transmits the decoded instruction to the corresponding reservation station 22.

During clock cycle CLK1, the address generation unit generates the data address for the memory operation and transmits the data address to load/store unit 26. During this clock cycle, the memory operation participates in the scan performed by LS1 control logic 64 (by virtue of the data address being provided) and is selected to probe data cache 28. Accordingly, the memory operation is in the scan pipeline stage of the LS1 pipeline.

During clock cycle CLK2, the data address is transmitted to data cache 28. As illustrated by the arrow within clock cycle CLK2, the memory operation is moved from LS1 buffer 60 to temporary buffer 68 at the end of clock cycle CLK2. The memory operation is in the address to data cache stage of the LS1 pipeline during clock cycle CLK2.

During clock cycle CLK3, the data address accesses data cache 28. Data corresponding to the memory operation (if the memory operation is a load) is forwarded at the end of clock cycle CLK3. Additionally, the memory operation is moved from temporary buffer 68 to LS2 buffer 62. The memory operation is in the cache access stage during clock cycle CLK3.

During clock cycle CLK4, an instruction dependent upon the memory operation (if the memory operation is a load) may be executed. Accordingly, the pipeline illustrated in FIG. 4 provides for a three clock cycle address generation to dependent operation execution load latency. Additionally, the memory operation is in the response pipeline stage during clock cycle CLK4. Data cache 28 provides hit/miss information and the physical address during the response stage. Accordingly, LS2 control logic 66 associates hit/miss information and the physical address with a memory operation in the response stage.

During clock cycle CLK5, the memory operation is in a response2 pipeline stage. During this stage, the miss address buffer tag identifying the miss address buffer entry assigned to the cache line accessed by the memory operation (if the memory operation is a miss) is provided by data cache 28. Accordingly, LS2 control logic 66 associates a MAB tag received from data cache 28 with a memory operation in the response2 stage.

Figure 5:
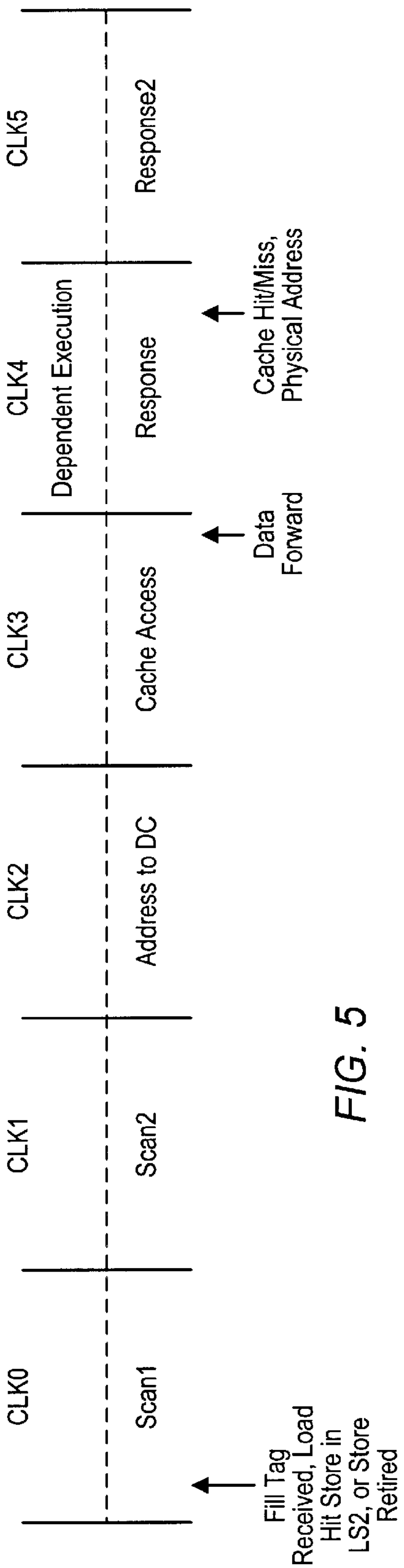
FIG. 5 is a timing diagram illustrating one embodiment of a data cache access pipeline from a second buffer (LS2) illustrated in FIG. 3.

Turning next to FIG. 5, a timing diagram illustrating an exemplary pipeline for a memory operation reprobing data cache 28 from LS2 buffer 62 is shown. Other embodiments employing different pipelines are possible and contemplated. In FIG. 5, clock cycles are delimited by vertical solid lines. A horizontal dashed line is shown as well. Pipeline stages related to other portions of processor 10 are shown to illustrate the interface of other elements to load/store unit 26.

During clock cycle CLK0, the memory operation participates in a scan of LS2 buffer entries and is selected to reprobe data cache 28. As illustrated by the arrow beneath clock cycle CLK0, the memory operation may be selected if a fill tag matching the MAB tag for the memory operation is received, if the memory operation is a load which hits an older store within LS2 buffer 62 (for which the data was not available on the previous probe), or if the memory operation is a store which has been retired by reorder buffer 32.

During clock cycle CLK1, the memory operation selected during the Scan1 stage enters the Scan2 stage. During the Scan2 stage, the memory operation is selected through muxes 76 and 72 for transmission to data cache 28. Accordingly, LS2 control logic 66 selects the memory operation in the Scan2 stage through multiplexor 76. Clock cycles CLK2, CLK3, CLK4, and CLK5 are the address to data cache, cache access, response, and response2 stages of the LS2 buffer reprobe pipeline and are similar to the corresponding stages described above. Accordingly, for the present embodiment, bus interface unit 37 may provide the MAB tag 4 clocks prior to providing the corresponding data, to allow selection of a load which accesses that corresponding fill data to be in the cache access stage during the clock cycle in which the fill data arrives at data cache 28 (and hence the fill data may be forwarded).

It is noted that the timing between the instruction pipeline stages above the dotted lines in FIGS. 4 and 5 and the memory operation pipeline stages below the dotted lines may be extended from those shown in FIGS. 4 and 5. For example, in FIG. 4, the address may not be generated exactly in the clock cycle immediately following the decode/dispatch cycle. Operands may not be available, or older instructions may be selected for address generation instead. Furthermore, a memory operation may not be scanned for access during the clock cycle the address is provided, as other older memory operations may be scanned instead.

Figure 6:
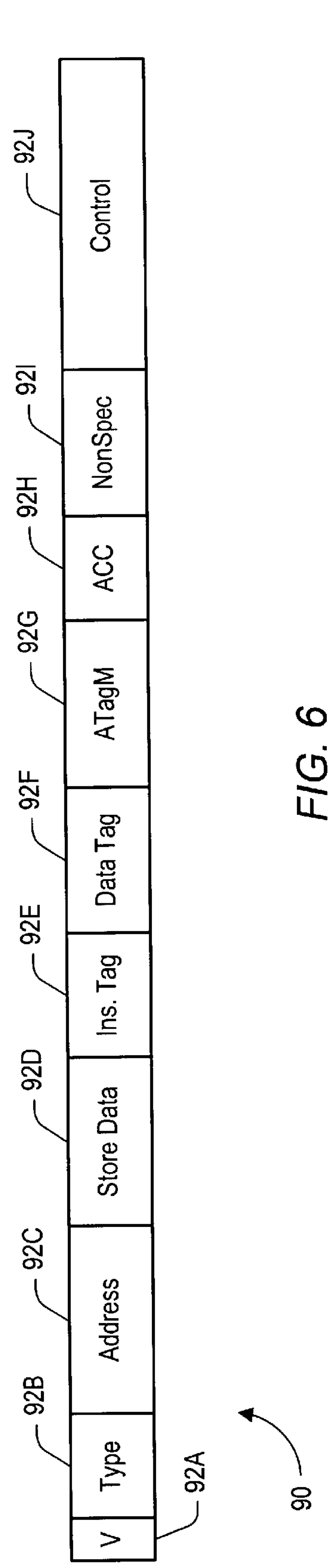
FIG. 6 is a block diagram of one embodiment of an entry within LS1.

Turning next to FIG. 6, a block diagram illustrating exemplary information which may be stored in one embodiment of an LS1 buffer entry 90 is shown. Other embodiments are possible and contemplated.

LS1 buffer entry 90 includes a valid field 92A which indicates the validity of the entry as well as certain fields within the entry. For example, valid field 92A may comprise a valid bit indicating whether or not the entry is valid, a data valid bit indicating whether or not store data is valid (if applicable), and an address valid bit indicating whether or not the data address is valid.

Type field 92B stores the type of memory operation represented within LS1 buffer entry 90. The memory operation may be a load, a store, or a load/store (for load-op-store instruction as may occur in the x86 instruction set architecture). Load/store types may probe data cache 28 once, and forward the data based on the probe, then subsequently perform the store when the instruction is retired. Accordingly, load/store types may occupy a single entry for both the load and the store memory operations.

Address field 92C stores the data address of the memory operation, and store data field 92D stores the store data corresponding to a store memory operation. Instruction tag field 92E stores the instruction tag assigned by reorder buffer 32 to the instruction corresponding to the memory operation. The instruction tag is used to capture the data address from address buses 44. Additionally, the instruction tag may be used to determine when the corresponding instruction is retired by reorder buffer 32 and may be used for loads as the result tag for forwarding data. Data tag field 92F stores the store data tag identifying the source of the store data for a store memory operation.

The address valid bit within valid field 92A indicates if address field 92C is valid. However, the data address may be provided by AGUs 42 and be selected for probing data cache 28 prior to the data address becoming valid in LS1 buffer entry 90. ATagM field 92G is used to indicate that the address tag provided by AGUs 42 in the previous clock cycle matched instruction tag field 92E for providing selection controls for port 0 mux 72 and port 1 mux 74. In one embodiment, ATagM field 92G may comprise a bit for each issue position to identify the issue position from which the data address is received. Accordingly, ATagM field 92G may be used to determine which LS1 entry should capture an address presented to LS1 buffer 60 from one of segment adders 70.

As illustrated in FIG. 4, removing an entry from LS1 buffer 60 may be delayed from the clock cycle in which the entry is selected for probing. Accordingly, accessed bit 92H is provided within LS1 buffer entry 90. Accessed bit 92H may be set to indicate that the memory operation was selected in the previous clock cycle for probing, and therefore should not be selected in the present clock cycle. Certain types of memory operations may be predetermined to be performed non-speculatively according to the instruction set architecture employed by processor 10 or according to design choice. Non-speculative bit 92I may be used to indicate such a memory operation.

Finally, a general control field 92J may be included for additional control bits as desired. For example, an embodiment of processor 10 employing the x86 instruction set architecture may include control information specific to the x86 architecture within control field 92J. For example, information related to the accessed segment, segment limit violations, and segment attributes may be stored in control field 92J. Furthermore, information such as the size of the memory operation (i.e. number of contiguous bytes affected by the memory operation) may be included, as may be any other desired control information according to design choice.

Figure 7:
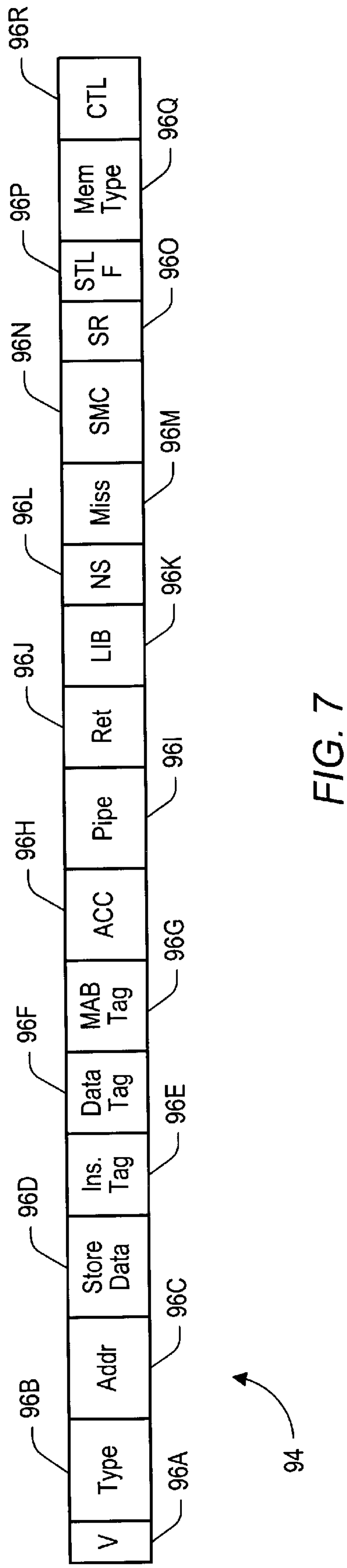
FIG. 7 is a block diagram of one embodiment of an entry within LS2.

Turning next to FIG. 7, a block diagram illustrating exemplary information which may be stored in one embodiment of an LS2 buffer entry 94 is shown. Other embodiments are possible and contemplated.

LS2 buffer entry 94 includes a valid field 96A which indicates the validity of the entry as well as certain fields within the entry. For example, valid field 92A may comprise a valid bit indicating whether or not the entry is valid, a data valid bit indicating whether or not store data is valid (if applicable), and a physical address valid bit indicating whether or not the physical data address is valid (i.e. whether or not a valid translation has been performed by data cache 28).

LS2 buffer entry 94 further includes a type field 96B, an address field 96C, a store data field 96D, an instruction tag field 96E, and a data tag field 96F similar to the fields 92B–92F described above. Additionally, store data field 96D may be used in the case of a load which hits an older store within LS2 buffer 62. For these cases, the store instruction tag of the store which the load hits is stored into data field 96D of the load entry. For subsequent reprobes, the older store can be located by comparing the store instruction tag instead of trying to scan for the address and prioritize the hits. Additional details regarding store to load forwarding for one embodiment of load/store unit 26 are provided further below. LS2 buffer 94 further includes a nonspeculative bit 96L similar to nonspeculative bit 92I described above.

MAB tag field 96G stores the MAB tag assigned by data cache 28 for a memory operation which misses. Similar to the accessed bit 92H, accessed bit 96H indicates that LS2 buffer entry 94 has been selected to access data cache 28 and is not currently eligible for selection. Additionally, LS2 buffer entry 94 includes a pipe field 96I which tracks the pipe stage occupied by the memory operation stored in the entry after it has been selected. Pipe field 96I may, for example, comprise a bit for each pipe stage. The bit for the first pipe stage may be set in response to selecting the memory operation in the entry, and then the field may be shifted each clock cycle as the memory operation progresses through the pipeline. Alternatively, an encoded value may be used. Information received from data cache 28 may be associated with the corresponding memory operation by scanning pipe fields 96I for a memory operation which is in the pipe stage at which the information is generated.

As mentioned above, memory operations may remain in LS2 buffer 62 after being retired by reorder buffer 32. Retired bit 96J is used to identify the entry as corresponding to an instruction which has been retired. Additionally, LS2 buffer entry 94 includes an last in buffer (LIB) bit 96K. LIB bit 96K is used when comparing stores within LS2 buffer 62 to loads probing data cache 28 for the first time. The last in buffer bit indicates that the store within the corresponding entry is the last (e.g. youngest) entry within the buffer to update the data address specified by that store. Accordingly, in the case in which multiple stores within the buffer are hit by a load, the store with the LIB bit set is selected as the store upon which the load is dependent. Complex hit prioritization logic may thereby be avoided. The same comparator circuitry used to compare probing loads against LS2 buffer 62 may be used to compare probing stores as well. If a probing store hits a store in LS2 buffer 62 for which LIB bit 96K is set, the LIB bit 96K is reset. Alternatively, a second bit may be set and interpreted as resetting LIB bit 96K. LIB bit 96K is set for a store buffer entry as the store buffer entry is allocated.

Miss bit 96M is used to identify whether or not the memory operation stored in LS2 buffer entry 94 is a miss in data cache 28. Miss bit 96M is set according to the hit/miss information provided by data cache 28 on hit/miss lines 82 (either on initial probe or reprobe). Additionally, LS2 buffer entry 94 includes a self-modifying code (SMC) field 96N for use with the SMC state machine described in more detail below for one embodiment of load/store unit 26. Snoop resync bit 96O is used to indicate synchronization due to snoops, as described below in more detail. Store load forward bit 96P is used to signify that the current entry is a load which hits an older store within LS2 buffer 62 (for which data is not available). Loads which hit earlier stores are selected for reprobing until the store data becomes available (at which time the data is forwarded for the load). A memory type field 96Q is included in LS2 buffer entry 94 as well. The memory type may be provided by data cache 28 upon translating the address of the memory operation. Among other things, the memory type may indicate if the memory operation is cacheable or non-cacheable. This information may be used for determining whether or not SMC checks are to be performed, according to one embodiment described below.

Finally, a general control field 96R may be included for additional control bits as desired. For example, additional information from the translation of the address which is specific to the instruction set architecture. In one embodiment, a reprobe bit may be included to indicate that a store hit must reprobe because intervening activity caused the line to be evicted. Additionally, the way of data cache 28 that hits may be stored for use in updating data cache 28 with store data. Yet another bit may be defined to indicate that bus interface unit 37 is in the process of acquiring a state for a cache line updated by a store which will allow the store to complete. Still further, linear address bits which have been translated but which are used for indexing may be stored in control field 96R. Control information may be included or excluded according to design choice.

Figure 8:
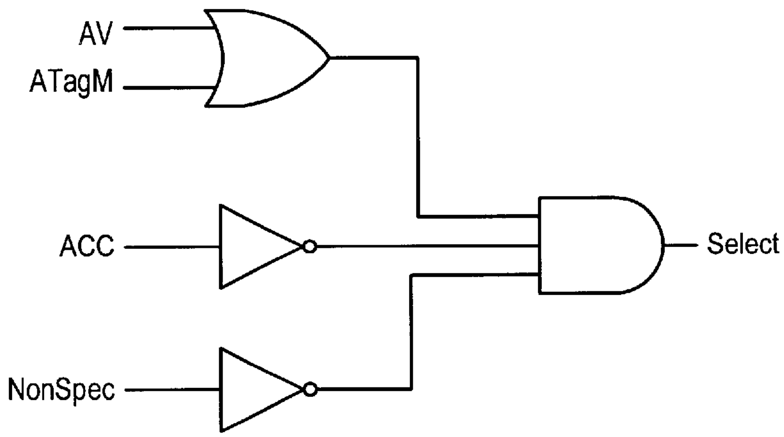
FIG. 8 is a circuit diagram illustrating a portion of one embodiment of selection logic for LS1.

Turning now to FIG. 8, a circuit diagram illustrating exemplary scan logic for an LS1 buffer entry is shown. Other embodiments and specific implementations are possible and contemplated. Any suitable logic may be used, including Boolean equivalents of the logic illustrated in FIG. 8. Other schemes may include additional or substitute selection criteria, as desired.

As illustrated in FIG. 8, an LS1 entry may be eligible for selection if the data address is valid (AV) or a tag match is detected for addresses being provided by the AGUs 42 (ATagM). Additionally, the entry is not eligible if it has been accessed for probing (ACC) or is restricted for executing nonspeculatively (NonSpec) until indicated as retireable by reorder buffer 32.

The outcome of the logic shown in FIG. 8 is that the corresponding entry is selectable for probing data cache 28. In one embodiment, load/store unit 28 limits the scan to the four oldest entries in LS1 buffer 60. Accordingly, selection logic similar to the shown in FIG. 8 may be employed for the four oldest entries, and may be qualified with whether or not older entries exist and are not selected.

Figure 9:
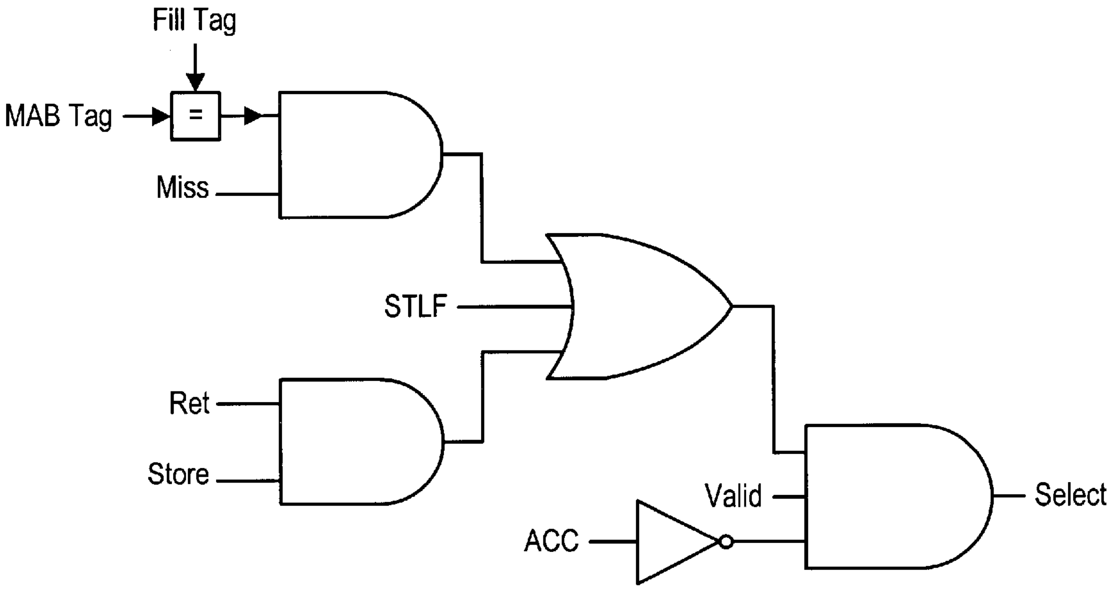
FIG. 9 is a circuit diagram illustrating a portion of one embodiment of selection logic for LS2.

Turning next to FIG. 9, a circuit diagram illustrating exemplary scan logic for an LS2 buffer entry is shown. Other embodiments and specific implementations are possible and contemplated. Any suitable logic may be used, including Boolean equivalents of the logic illustrated in FIG. 8. Other schemes may include additional or substitute selection criteria, as desired.

For the embodiment of FIG. 9, an LS2 buffer entry may be eligible for reprobing if a fill tag provided by bus interface unit 37 matches the MAB tag of that entry and the entry is a miss, or if the entry is a load which hits a store for which data is not available (STLF) or if the entry is retired (RET) and is a store. Additionally, the entry is selectable if it is valid and not accessed (ACC).

Similar to the embodiment of FIG. 8, the outcome of the logic shown in FIG. 9 is that the corresponding entry is selectable for reprobing data cache 28. The selectability of an entry may be qualified with whether or not older selectable entries exist.

Dependency Link File As mentioned above, load/store unit 26 is configured to handle the cases in which a probing load memory operation hits an older store memory operation stored in LS2 buffer 62. Generally speaking, a load memory operation is said to "hit" a store memory operation if the load memory operation accesses at least one byte which is updated by the store memory operation. Similarly, the load address may be determined to hit the store address if the load address (and the size of the operation) indicate that at least one byte updated by the store is accessed by the load.

Generally, load/store unit 26 compares data addresses of memory operations probing data cache 28 from LS1 buffer 60 to memory operations within LS2 buffer 62. If a probing load hits a store in LS2 buffer 62 and the store data is available with LS2 buffer 62, the store data is transmitted to data cache 28 for forwarding in place of any load data which may be in cache. On the other hand, a probing load may hit a store in LS2 buffer 62 for which store data is not available. For this case, forwarding of data from data cache 28 is cancelled and the load memory operation is selected for reprobing from LS2 buffer 62 until the store data becomes available (according to the scan mechanism described above). Eventually, the store data may become available within LS2 buffer 62 and forwarded therefrom during a reprobing by the load, or the store may update data cache 28 and the data may be forwarded from data cache 28 during a reprobing by the load. Finally, store memory operations which hit store memory operations in the buffer may cause the LIB bit for the hit store memory operations to be reset.

In order to simplify the determination of which store is hit by a load which reprobes from LS2 buffer 62, the store instruction tag of the store hit by the load upon initial probing from LS1 buffer 60 is recorded in the LS2 buffer entry of the load. During reprobings from LS2 buffer 62, instead of comparing the data address of the load to the data addresses of stores within LS2 buffer 62, the store instruction tag recorded for the load is compared to the store instruction tags within LS2 buffer 62. If the store instruction tag recorded for the load matches a store instruction tag within LS2 buffer 62 and the store data is available, the store data is forwarded for the load in a manner similar to the initial probe case described above. Similarly, if the store instruction tag recorded for the load matches a store instruction tag within LS2 buffer 62 and the store data is not available, forwarding is cancelled and the load is selected again for reprobing at a later time. If the store instruction tag recorded for the load does not match a store instruction tag, the data is forwarded from data cache 28.

Generally speaking, store data is "available" from a storage location if the store data is actually stored in that storage location. If the data may at some later point be stored in the storage location but is not yet stored there, the data is "not available", "not yet available", or "unavailable". For example, store data may be not available in a LS2 buffer entry if the store data has not been transmitted from the source of the store data to the LS2 buffer entry. The source of the store data is the instruction which executes to produce the store data, and may be the same instruction to which the store corresponds (an instruction specifying a memory operand as the destination) or may be an older instruction. The store data tag identifies the source of the store data and hence is compared to result tags from the execution units 40 to capture the store data.

Figure 10:
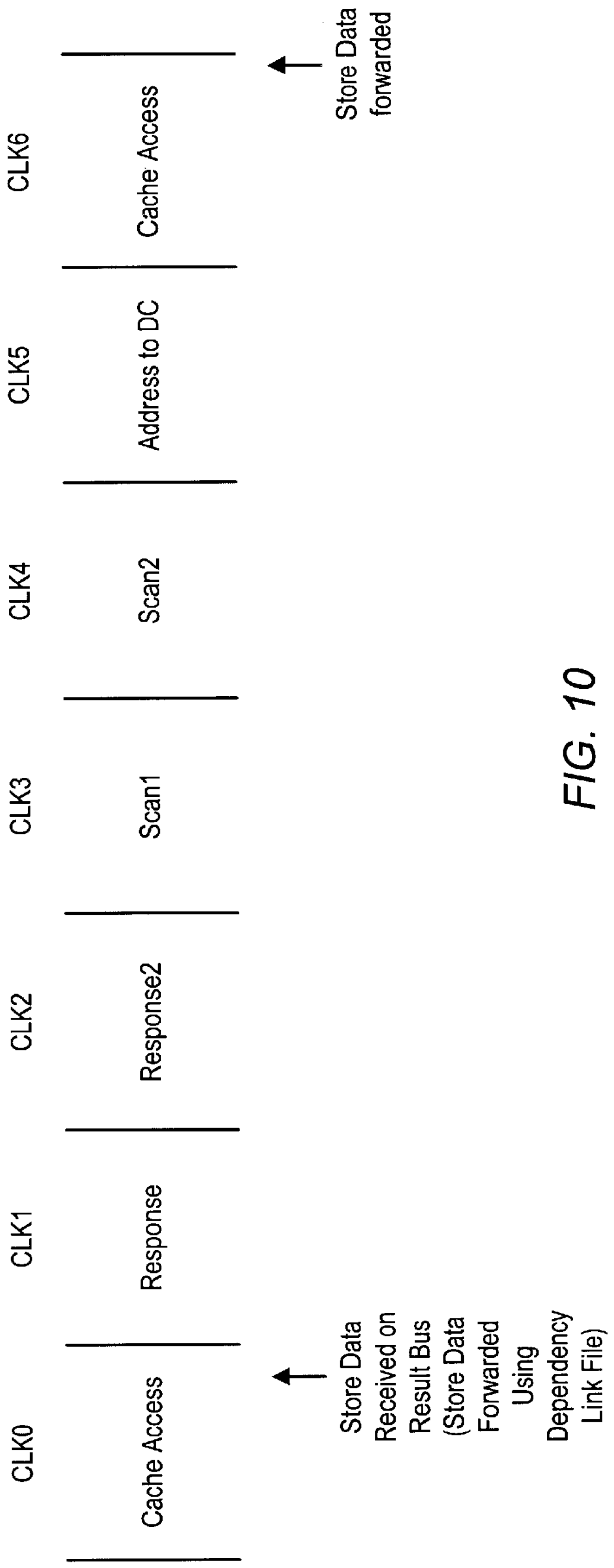
FIG. 10 is a timing diagram illustrating data forwarding with and without a dependency link file.

While the above described mechanism, loads dependent on older stores receive the correct data. However, in many cases the above mechanism may lead to significant delays in the forwarding of data for a load (as measured from the store data becoming available). FIG. 10 is a timing diagram illustrating an example of such a delay according to one embodiment of load/store unit 26. Similar to the timing diagrams above, FIG. 10 illustrates a set of clock cycles delimited by vertical solid lines. The pipeline stages of load/store unit 26 which a load hitting an older store is occupying during each clock cycle of the example are listed within each clock cycle. Accordingly, the load is in the cache access stage during clock cycle CLK0, the response stage during clock cycle CLK1, the response2 stage during clock cycle CLK2, the scan1 stage during clock cycle CLK3, the scan2 stage during clock cycle CLK4, the address to data cache stage during clock cycle CLK5, and the cache access stage again during clock cycle CLK6.

In the example, store data is made available at the end of clock cycle CLK0. To achieve the minimum latency for the load, it would be desirable to forward the data during clock cycle CLK0. Dependent operations could then execute in clock cycle CLK1. However, according to one embodiment, the store data may not be forwarded. Accordingly, the store data is forwarded upon reprobe of data cache 28 during clock cycle CLK6.

It is noted that even more significant delays could be experienced. For example, the load might not be immediately selected in the Scan1 stage of clock cycle CLK4. Multiple clock cycles may elapse before the load is selected to reprobe data cache 28. Furthermore, even if the load were not in the pipeline at the time the store data arrives in clock cycle CLK0 (e.g. if the load were sitting idle in LS2 buffer 62), a significant delay may be experienced prior to the load being selected for reprobing. Still further, even if LS2 control logic 66 were configured to select the load for reprobing in response to receiving the store data, a delay of four clock cycles (in the present embodiment) would be experienced.

One embodiment of load/store unit 26 may employ a forwarding mechanism which allows for forwarding of the store data upon receipt of the store data (independent of the reprobing of the corresponding load). Such an embodiment may forward store data to instructions dependent upon the load during, e.g., clock cycle CLK0 shown in FIG. 10.

Figure 11:
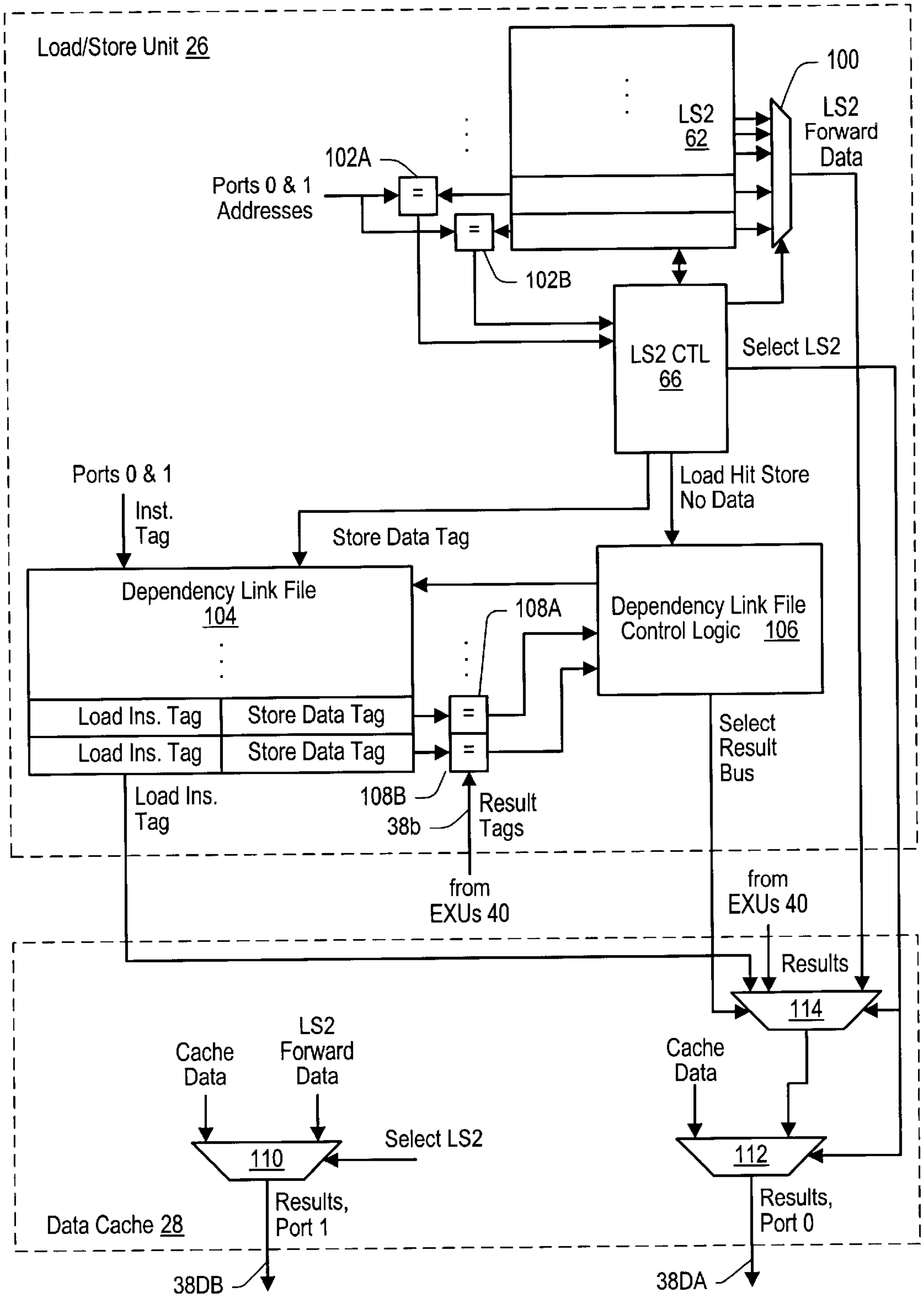
FIG. 11 is a block diagram of one embodiment of a load/store unit and a data cache, with the load/store unit employing a dependency link file.

FIG. 11 illustrates one embodiment of a portion of load/store unit 26 and data cache 28. Other embodiments are possible and contemplated. In the embodiment of FIG. 11, load/store unit 26 includes LS2 buffer 62, LS2 control logic 66, a data forward mux 100, address comparators 102A–102B, a dependency link file 104, a dependency link file control logic 106, and store data tag comparators 108A–108B. Additionally, in the embodiment of FIG. 11, data cache 28 includes a port 1 data mux 110, a port 0 data mux 112, and a LS2 forward data mux 114. LS2 buffer 62 is coupled to data forward mux 100, comparators 102A–102B, and LS2 control logic 66. LS2 control logic 66 is further coupled to muxes 100, 110, 112, and 114. LS2 control logic 66 is further coupled to dependency link file control logic 106, dependency link file 104, and comparators 102A–102B. Dependency link file 104 is coupled to receive instruction tags corresponding to data cache ports 0 and 1, to LS2 data forward mux 114, to comparators 108A–108B, and to dependency link file control logic 106. Dependency link file control logic 106 is further coupled to mux 114 and comparators 108A–108B. Comparators 102A–102B are coupled to receive data addresses presented on ports 0 and 1 of data cache 28. Comparators 108A–108B are coupled to receive result tags on buses 38*b*. Mux 114 is coupled to mux 112. Mux 112 is coupled to provide results on result bus 38DA, and similarly mux 110 is coupled to provide results on result bus DB. Result buses 38DA–38DB may form one embodiment of result buses 38D as shown in FIG. 2.

Generally speaking, load/store unit 26 is configured to detect a load which hits a store for which the corresponding store data is not available. In response to detecting such a load, load/store unit 26 allocates an entry in dependency link file 104 for the load. The dependency link file entry stores a load identifier (e.g. the instruction tag assigned by reorder buffer 32 to the instruction corresponding to the load) identifying the load which hits the store and a store data identifier (e.g. the store data tag) identifying the source of the store data corresponding to the store hit by the load. Load/store unit 26 monitors results buses 38 for the store data tags stored within dependency link file 104. Upon detecting that store data is being provided on one of result buses 38, load/store unit 26 directs data cache 28 to forward the data from the corresponding result bus onto a result bus from data cache 28. Additionally, the load identifier from the corresponding entry is forwarded as the result tag. In this manner, the store data is directly forwarded, during the clock cycle the store data is provided, to any operations dependent upon the load data. Advantageously, the latency from receiving store data to forwarding the store data to a previously probing load may be reduced. In one embodiment, the latency may be reduced to zero clock cycles.

As described above, load addresses are compared to store addresses within LS2 buffer 62 to detect loads which hit older stores. Accordingly, comparators such as comparators 102 are provided. Comparators 102 are provided to compare addresses on each port of data cache 28 to the data addresses stored within LS2 buffer 62. As an example, one embodiment of data cache 28 includes two ports, each of which may receive a different load address during a clock cycle. Such an embodiment may include two comparators 102 for each LS2 buffer entry. For simplicity in the drawing, not all of the comparators 102 have not been illustrated. If an address on one of the ports to data cache 28 hits a data address within LS2 buffer 62, the corresponding comparator 102 asserts a signal to LS2 control logic 66. LS2 control logic 66 determines if the port is being used for a load, if the entry which is hit is a store, and whether or not the corresponding store data is available.

If a load hit on a store entry is detected and the corresponding store data is available, LS2 control logic 66 selects the store data using data forward mux 100, and provides the data to either LS2 data forward mux 114 or to port 1 mux 110, based upon the port for which the hit is detected. Accordingly, data forward mux 100 may comprise a set of independent muxes, one for each port. Additionally, LS2 control logic 66 asserts a corresponding signal to data cache 28 for data cache 28 to select the forwarded data in place of cache data read from data cache 28 for the hitting load.

If a load hit on a store is detected and the corresponding store data is not available, LS2 control logic 66 signals data cache 28 to cancel data forwarding. Additionally, LS2 control logic 66 signals dependency link file control logic 106 that a load hitting a store with unavailable data has been detected. Additionally, LS2 control logic 66 reads the store data tag from the entry which is hit and provides the store data tag to dependency link file 104 (or alternatively causes LS2 buffer 62 to transmit the store data tag to dependency link file 104). If more than one store is detected as being hit by a load, LS2 control logic 66 selects the entry for which the LIB bit 96K is set.

Dependency link file 104 is also coupled to receive the instruction tags corresponding to the memory operations probing data cache 28 via ports 0 and 1. In response to the signal from LS2 control logic 66, dependency link file control logic 106 allocates an entry within dependency link file 104. The load instruction tag and the store data tag of the store hit by the load are stored into the allocated entry of dependency link file 104.

Dependency link file control logic 106 monitors the result tags upon result buses 38 to detect the store data tags stored within dependency link file 104. Accordingly, comparators 108 (including comparators 108A–108B) are provided. In general, the number of comparators may be the number of result tags monitored multiplied by the number of entries within dependency link file 104. For simplicity in the drawing, not all comparators 108 are shown in FIG. 11. Comparators 108, upon detecting equality between the store data tag of the corresponding entry and a result tag upon result tags buses 38*b*, signals dependency link file control logic 106. Dependency link file control logic causes the corresponding load instruction tag to be read from dependency link file 104 and to be provided to mux 114. In addition, based upon the result bus from which the result tag matching the store data tag is received, dependency link file control logic 106 signals data cache 28 to select the corresponding data (and the load instruction tag) through LS2 data forward mux 114 and through port 0 mux 112 onto port 0 result bus 38DA. In this manner, the store data is forwarded as load data for the corresponding load. Finally, dependency link file control logic 106 deletes the entry for which data is forwarded from dependency link file 104, allowing for a subsequent load to be allocated to that entry.

In one embodiment, dependency link file 104 is used to forward load data if the following conditions are met: (i) the load address and the store address which is hit match exactly (i.e. identify the same byte); and (ii) the store size is equal to or greater than the load size (i.e. the store updates every byte accessed by the load). Other embodiments may employ more or fewer restrictions, as desired.

In the present embodiment, load/store unit 26 uses port 0 of data cache 28 to forward the load data for a load represented in dependency link file 104. Accordingly, upon detecting that load data is to be forwarded, dependency link file control logic 106 may signal LS1 control logic 64 and LS2 control logic 66. Control logics 64 and 66 may inhibit selecting an operation for port 0 and may stall the port 0 pipeline to allow use of port 0 result bus 38DA by dependency link file 104.

If LS2 control logic 66 determines that a store upon one of data cache ports 0 and 1 hits an older store, the LIB bit for the older store is reset. The LIB bit for the store on the data cache port is set upon storing of the entry into LS2 buffer 62. Finally, if LS2 control logic 66 determines that a store hits an older load, the hit detected by comparators 102 is ignored.

It is noted that more than one store data tag within dependency link file 104 may be detected as being forwarded during a clock cycle. In the present embodiment, dependency link file control logic 106 may select one entry for forwarding and invalidate the other entries. Subsequent reprobes by the loads corresponding to the invalidated entries may cause the corresponding data to be forwarded from LS2 buffer 62. Alternatively, a mux similar to mux 114 may be provided for port 1 as well, to allow the forwarding of a second load from dependency link file 104. In yet another alternative, dependency link file control logic 106 may be configured to capture the store data for the additional entries within dependency link file 106 and forward the data during subsequent clock cycles.

In the present embodiment, dependency link file 104 is a performance enhancement, but does not supplant the reprobe mechanism for forwarding data. Accordingly, in cases in which dependency link file 104 is full upon detection of a load hitting a store with unavailable data, dependency link file control logic 106 may not allocate an entry. While any number of dependency link file entries may be employed as desired, in one embodiment 4 entries are provided. During a subsequent reprobe, an entry may be allocated if available in the same fashion as entries are allocated upon an initial probing from LS1 buffer 60. Still further, loads for which dependency link file entries are allocated still participate in LS2 scanning and reprobing in the present embodiment. Subsequent to forwarding of load data for a load via dependency link file 104, the load may reprobe data cache 28 and have the store data forwarded from LS2 buffer 62 in the manner described above. This extra forwarding may be harmless since the previous forwarding via dependency link file 104 satisfies dependencies on the load. It is still further noted that, if a reprobe of a load for which a dependency link file entry is already allocated is performed, dependency link file control logic 106 inhibits allocating another entry for the load (e.g. by comparing the load instruction tag to the tags stored in dependency link file 104).

In yet another embodiment, dependency link file 104 may be used to forward data in all cases of load hit store without data available. In such an embodiment, if a load hits a store without available data and dependency link file 104 is full, the load is selected for reprobing until an entry becomes available. However, upon allocation of a dependency link file entry the load may be prevented from reprobing and the store data is forwarded using dependency link file 104.

It is further noted that, while the present embodiment is shown for use with LS2 buffer 62, other embodiments are contemplated in which dependency link file 104 is employed within an embodiment of load/store unit 26 having a conventional store queue storing only store memory operations which have probed data cache 28.

It is noted that, while one embodiment of load/store unit 26 employing the dependency link file described above reduces the store data to load forward latency to zero clock cycles, another contemplated embodiment may capture the store data and forward during a succeeding clock cycle. While the latency in such an embodiment would be one clock cycle, timing problems may be eased for such an approach. Yet other embodiments may employ additional clock cycles of latency from store data to load forwarding using the dependency link file described. It is noted that dependency link file 104 may be viewed as a buffer having a plurality of entries, each entry storing the load instruction tag and corresponding store data tag as described above.

Snoop Resync for Load Ordering

Figure 12:
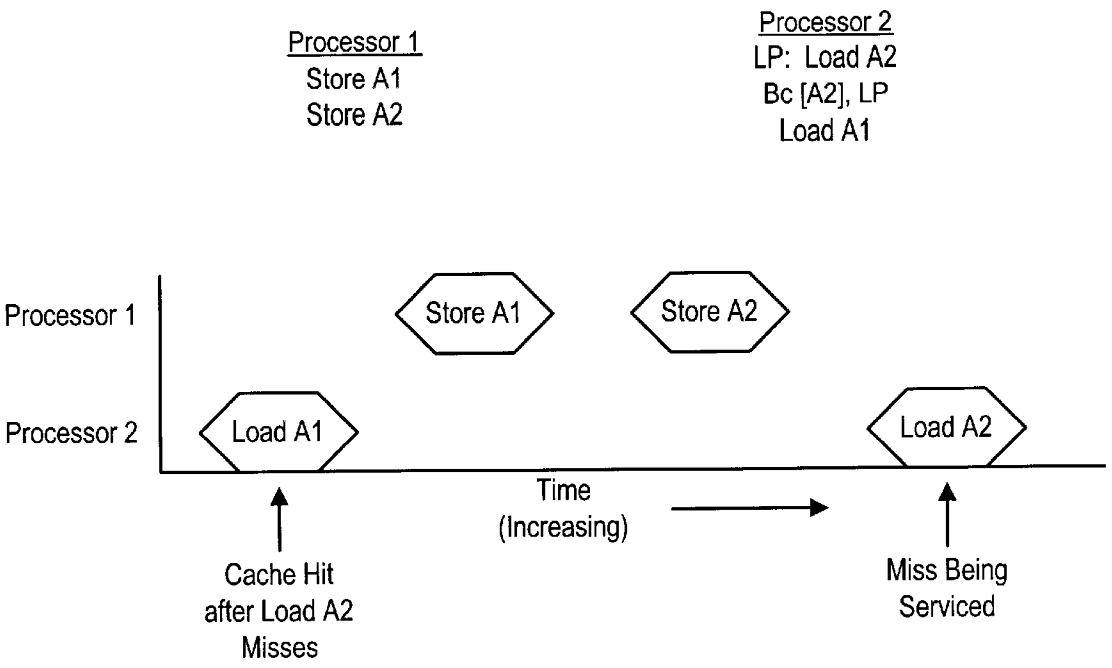
FIG. 12 is a timing diagram illustrating exemplary loads and stores performed by two processors.

Turning now to FIG. 12, a timing diagram is shown illustrating exemplary loads and stores performed by a pair of processors (processor 1 and processor 2). The timing diagram illustrates a problem which may occur in processors which: (i) implement an instruction set architecture requiring strong memory ordering; and (ii) allow loads which hit to proceed before older loads which are misses are serviced from memory.

Above the timing diagram in FIG. 12, a list of the program order of the exemplary memory operations is shown, with older operations listed prior to younger operations. Accordingly, processor 1 performs a store to an address A1 followed by a store to an address A2 (according to the program order), while processor 2 performs a load from address A2 followed by a conditional branch based on the value stored at A2 and a load from address A1. The sequence executed by processor 2 may be used, for example, if address A1 identifies a memory location used as a semaphore for passing control of a memory location identified by address A2 from processor to processor. Generally, a processor checks the semaphore to determine if another processor controls the protected memory location(s) prior to reading or taking control of the protected memory location (s). If the semaphore is non-zero, for example, the protected memory location(s) may be controlled by another processor. The reading processor may inhibit access to the protected memory location(s) (e.g. via the conditional branch) until the semaphore is updated to a zero value. Use of a semaphore in the manner shown for processor 2, along with having strong memory ordering, can guarantee that the load from address A2 (executed by processor 2) receives the update of A1 performed by processor 1.

Generally, strong memory ordering requires that memory operations performed by a processor be detected by other processors as occurring in program order. The timing diagram of FIG. 12 illustrates a case in which the order of the stores by processor 1 may appear to occur out of order to the instruction stream executed by processor 2 by allowing loads to receive data out of order. As the timing diagram illustrates, the load from A1 can be completed within processor 2 as a hit in the data cache prior to the store to A1 by processor 1. Subsequently, the store to A2 may be performed by processor 1 followed by the load from A2 by processor 2. In this sequence of events, the load from A2 by processor 2 would receive the updated value according to the store to A2, but the load from A1 (which follows the load to A2 in program order) would not receive the updated value according to the store to A1. If the store to A2 is a value allowing the conditional branch to be not taken, strong memory ordering rules would be violated.

As described above, one embodiment of load/store unit 26 performs stores in program order (by updating data cache 28 or providing the stores to bus interface unit 37 upon retirement of the store memory operations). Loads, on the other hand, may complete out of order in general. More particularly, loads probe data cache 28 in program order but a load which hits (either an older store or in data cache 28) may forward data prior to older load misses being serviced and load misses may be serviced out of order. Accordingly, processor 10 may experience a strong memory ordering violation if the load from A2 misses and the load from A1 hits (or misses and is serviced prior to the load from A2). More generally, processor 10 may experience a strong memory ordering violation if a load hit is snoop hit by an update-type operation prior to an older load miss being serviced.

Figure 13:
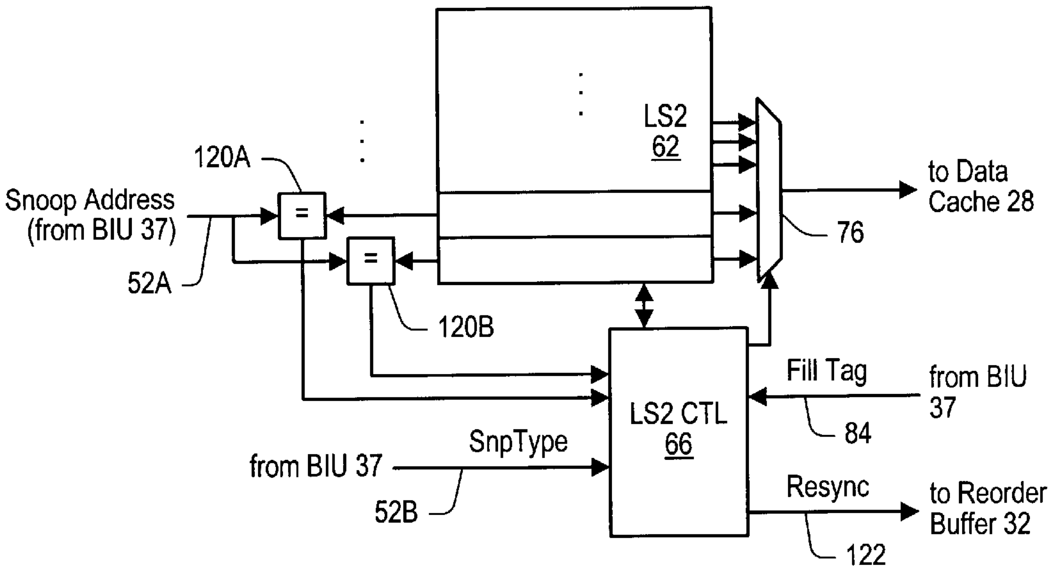
FIG. 13 is a block diagram of a portion of one embodiment of a load/store unit including snoop hardware.

Turning next to FIG. 13, one embodiment of a portion of one embodiment of load/store unit 26 which may handle strong memory ordering correctly is shown. Other embodiments are possible and contemplated. The portion of load/store unit 26 illustrated in FIG. 13 includes LS2 buffer 62, LS2 control logic 66, reprobe mux 76, and a plurality of comparators 120A–120B. Comparators 120A–120B are coupled to LS2 buffer 62 and to receive a snoop address corresponding to a snoop request on snoop address bus 52A (part of snoop interface 52). Additionally, comparators 120A–120B are coupled to LS2 control logic 66. LS2 control logic 66 is coupled to LS2 buffer 62 and reprobe mux 70, and is coupled to receive a snoop type on a SnpType bus 52B (part of snoop interface 52) and a fill tag on fill tag bus 84 from bus interface unit 37. LS2 control logic 66 is further coupled to a resync line 122 to reorder buffer 32.

Generally speaking, load/store unit 26 is configured to store load memory operations into LS2 buffer 62 independent of the memory operations data cache hit/miss status. Additionally, LS2 control logic 66 is configured to snoop memory operations within LS2 buffer 62 against snoop requests from bus interface unit 37. If a load which is a data cache hit (a "load hit" for discussion of FIGS. 12–16) is snoop hit by a snoop invalidate request (e.g. due to a store to the address by another processor), LS2 control logic 66 scans the older memory operations within LS2 buffer 62. If any older load memory operations within LS2 buffer 62 are data cache misses (a "load miss" for discussion of FIGS. 12–16), a synchronization indication is set for that older load memory operation. Subsequently, the older load miss is completed. LS2 control logic 66 detects the synchronization indication while completing the load miss, and signals reorder buffer 32. Reorder buffer 32 responds to the signal by synchronizing to the instruction corresponding to the completing load miss. Advantageously, the load hit which was performed out of order and which was found to violate strong memory ordering rules is discarded and reexecuted. When reexecuted, the load hit may receive the updated value for the memory location accessed and strong ordering may be achieved.

Generally, a "snoop invalidate request" is a type of snoop request which causes the snooped cache line (if found) to be invalidated. Similarly, a snoop invalidate operation is a snoop operation which causes the snooped cache line (if found) to be invalidated. Among other reasons, a snoop invalidate operation may be initiated if a store to the snooped cache line is being performed by another processor, to allow that processor to establish proper ownership of the cache line prior to performing the store. The term "ownership" refers to the level of access to a cache line which is granted to a particular processor storing the cache line, and to the level of responsibility of that particular processor for maintaining coherency of that cache line. The ownership may be determined by the ownership maintained by other processors as well as by system level considerations, and is generally one of several states defined according to a coherency scheme. For example, the MOESI coherency scheme defines the modified state (in which the processor has exclusive use of the cache line and has modified it with respect to the data stored in main memory), the owned state (in which the processor is responsible for maintaining coherency of the cache line but has shared the modifications made by the processor with at least one other processor), the exclusive state (in which the processor has exclusive use of the cache line but has not modified it), the shared state (in which two or more processors have shared use of the cache line), and the invalid state (in which the processor has no use of the cache line). Other coherency schemes (such as the MESI, MOSI, etc.) schemes are possible as well.

As used herein, the term "synchronization" refers to restoring the speculative state of the processor to a state consistent with a particular point in the instruction sequence being executed. More particularly, the speculative state of processor does not reflect execution of any instructions beyond the particular point. Instructions may be fetched starting at the particular point subsequent to the synchronization. Generally, synchronization may be performed to correct the effects of incorrect speculative execution.

In one embodiment, the synchronization indication within LS2 buffer 62 comprises snoop resync bit 96O. Snoop resync bit 96O may be set to indicate that synchronization is to be performed upon completion of the corresponding load. Accordingly, upon detecting a snoop hit for a snoop invalidate request on a load hit within LS2 buffer 62, LS2 control logic 66 scans LS2 buffer 62 for older load miss entries and sets the corresponding snoop resync bit 96O. Alternatively, the bit may be set initially and cleared to indicate synchronization, as desired. Load misses may be indicated, e.g., by the miss bit 96M being set in the corresponding LS2 buffer entry.

The snoop requests conveyed to load/store unit 26 include a snoop address provided on snoop address bus 52A and a snoop type conveyed on SnpType bus 52B. The snoop address is compared, via comparators 120, to the data address stored in each entry of LS2 buffer 62. Accordingly, a comparator 120 may be included for each LS2 buffer entry. Comparators 120A–120B are illustrated as exemplary comparators to maintain simplicity in the drawing. If the comparator 120 detects that the snoop address is within the same cache line as the data address of the corresponding memory operation, the comparator signals LS2 control logic 66. LS2 control logic 66 examines the identified entry or entries and the snoop type provided by bus interface unit 37. If the snoop type is invalidate and the identified entry is a hit, LS2 control logic 66 scans the older LS2 buffer entries and sets the corresponding snoop resync bits 96O if any older load misses are found. LS2 control logic 66 may perform other snoop operations using the output of comparators 120, as desired. For example, a store which hit data cache 28 during its initial probe may be indicated to be a miss in response to a probe, so that the store will be reprobed before attempting to commit data to the cache.

The older load miss entries are subsequently completed in response to a fill tag from bus interface unit 37 matching the MAB tag assigned to the older load miss, in the present embodiment. Generally, a memory operation is referred to as "complete" if status corresponding to the memory operation has been returned to reorder buffer 32. Reorder buffer 32 is configured to retire the memory operation according to the returned status (which may indicate synchronization, exception, etc.). Synchronization may be indicated by asserting the resync signal on resync line 122 while data is being forwarded for the corresponding load memory operation (e.g. during the cache access stage of the pipeline embodiment shown above). Other signal lines may be used to report other status, as desired.

Reorder buffer 32 may respond to the resync signal in a manner similar to branch mispredictions: by discarding the instructions subsequent to the instruction corresponding to the load for which the resync signal is asserted, and refetching the instructions. Since the load hit which was snoop hit in order to cause the synchronization is subsequent to the load miss in program order, the load hit is discarded, refetched, and reexecuted. It is noted that memory operations within LS1 buffer 60 and LS2 buffer 62 corresponding to discarded instructions are deleted. Any suitable discard scheme may be employed by reorder buffer 32. For example, reorder buffer 32 may broadcast the tag of the instruction for which subsequent instructions are to be discarded, and load/store unit 26 (and other portions of processor 10) may discard the corresponding instructions and memory operations. Alternatively, reorder buffer 32 may communicate with load/store unit 26 to identify memory operations to be discarded using retire interface 54. Load/store unit 26 may forward random data for loads to be discarded, and dependent instructions may execute and return results to reorder buffer 32, which may then discard the instructions.

Upon reexecution, the correct value for the load will be read from memory (since the snoop invalidate request is also transmitted to data cache 28 and causes the cache line accessed by the load to be invalidated). In this manner, strong memory ordering is observed while allowing load hits to generally precede load misses where strong memory ordering is not violated.

It is noted that the term "cache line" has been used herein to describe the granularity upon which coherency is maintained. However, other granularities corresponding to a portion of a cache line or multiple cache lines may be used. Accordingly, coherency may be maintained on a "cache block" basis, which may be a portion of a cache line, a cache line, or multiple cache lines, as desired.

Figure 14:
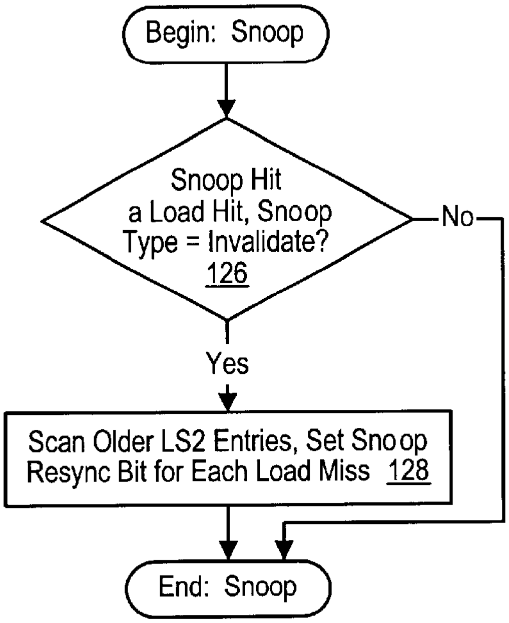
FIG. 14 is a flowchart illustrating operation of one embodiment of control logic shown in FIG. 13 during a snoop request.

Turning next to FIG. 14, a flowchart is shown illustrating the operations performed by the embodiment of LS2 control logic 66 shown in FIG. 13 in response to a snoop operation. Other embodiments are possible and contemplated. LS2 control logic 66 determines if the snoop request hits a load hit and the snoop type is invalidate (decision block 126). If the snoop request does hit a load hit and the snoop type is invalidate, LS2 control logic 66 scans the older LS2 entries and sets the snoop resync bit for each load miss (step 128). Conversely, if the snoop request does not hit a load hit or the snoop type is not invalidate, LS2 control logic 66 does nothing. Optionally, other snoop activities may be performed in connection with maintaining coherency, as desired.

In an alternative embodiment, LS2 control logic 66 may set the snoop resync bit for the load hit which is hit by the snoop. When each load miss is reprobed, the LS2 control logic 66 may scan LS2 buffer 62 to determine if any valid entries have the snoop resync bit set. If at least one snoop resync bit is set, LS2 control logic 66 may return resync status for the load miss.

Figure 15:
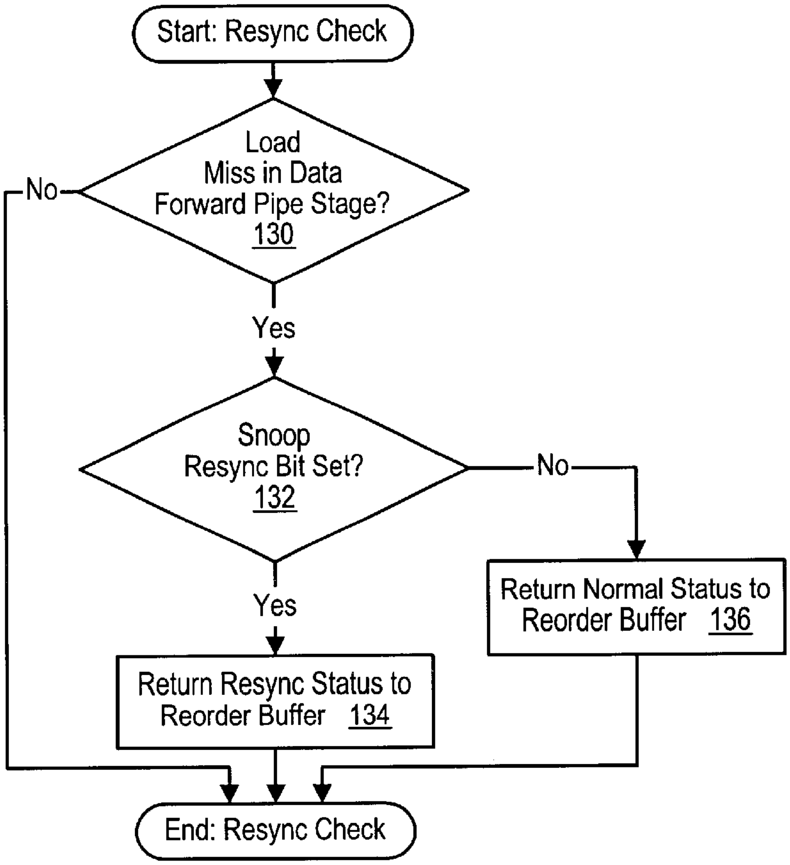
FIG. 15 is a flowchart illustration operation of one embodiment of control logic shown in FIG. 13 during a reprobe operation.

Turning next to FIG. 15, a flowchart is shown illustrating the operations performed by the embodiment of LS2 control logic 66 shown in FIG. 13 in order to complete a load miss operation. Other embodiments are possible and contemplated. LS2 control logic 66 determines if a load miss is in the data forward pipeline stage of the pipeline (decision block 130). For example, in the present embodiment the data forward pipeline stage is the cache access stage. LS2 control logic 66 may determine if a load miss is in the cache access stage by examining its pipe field 96I, for example. If no load miss is in the data forward pipeline stage, then no action is taken with respect to the resync signal. On the other hand, if a load miss is in the data forward pipeline stage, LS2 control logic 66 examines the corresponding snoop resync bit 96O (step 132). If the corresponding snoop resync bit 96O is set, then LS2 control logic 66 asserts the resync signal on resync line 122 to return resync status (step 134). On the other hand, if the corresponding snoop resync bit 96O is clear, then LS2 control logic 66 deasserts the resync signal to return normal status (step 136). It is noted that other status, such as exceptions, may be returned in the normal status state from other logic.

Figure 16:
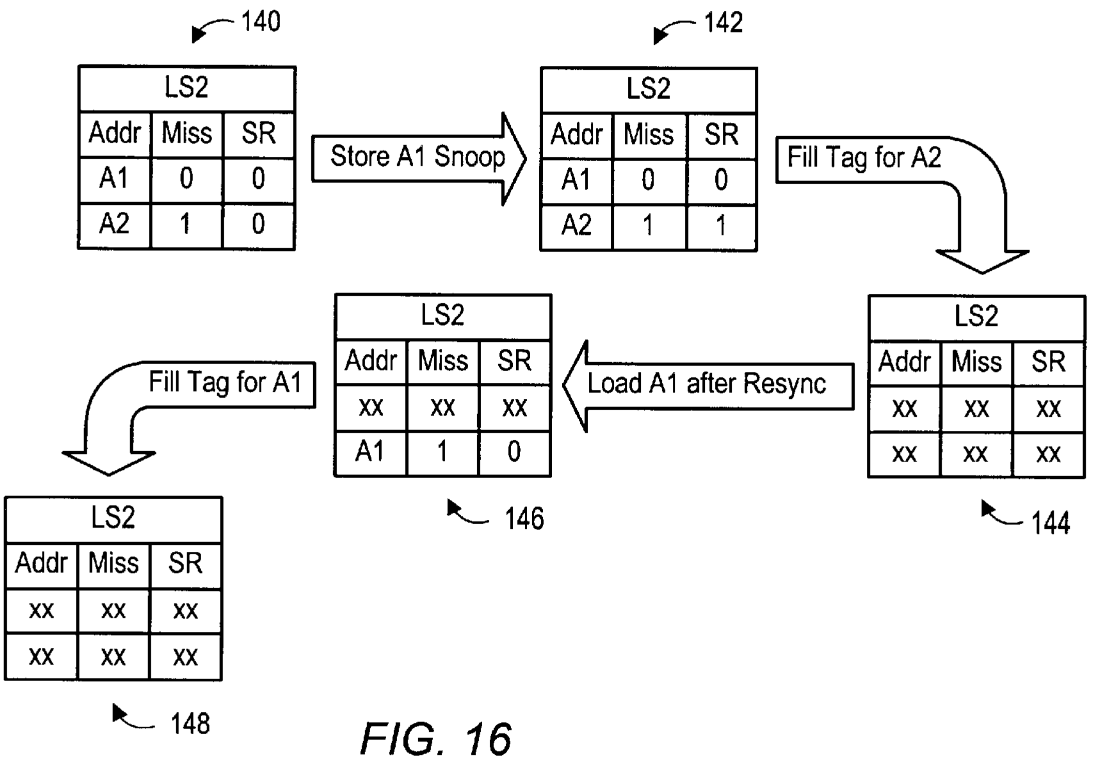
FIG. 16 is a diagram illustrating an example of snoop resync operation.

Turning next to FIG. 16, an example is shown of the operation of one embodiment of LS2 buffer 62 for processor 2 in the timing diagram of FIG. 12. Select portions of the LS2 buffer entries are illustrated, including address field 96C (Addr in FIG. 16), miss bit 96M (Miss in FIG. 16), and snoop resync bit 96O (SR in FIG. 16).

At reference numeral 140, LS2 buffer 62 is shown subsequent to detecting the load miss for address A2 and the load hit for address A1. Accordingly, an LS2 buffer entry containing address A2 has the miss bit set and the snoop resync bit clear, while an LS2 buffer entry containing address A1 has the miss bit and the snoop resync bit clear.

After receiving the snoop invalidate request corresponding to processor 1's store to address A1, reference numeral 142 illustrates the state of LS2 buffer 62. The snoop resync bit for the entry containing address A2 has been set by virtue of the load to address A2 being older than the load hit to address A1 and the load to address A2 being a miss.

Subsequent to the snoop invalidate request, bus interface unit 37 returns the fill tag matching the MAB tag for the load to address A2. Load/store unit 26 returns resync status to reorder buffer 32 for the load to address A2, and processor 2 synchronizes. The synchronization causes the entry for address A1 to be discarded. At reference numeral 144, the state of LS2 buffer 62 subsequent to the synchronization (and retirement of the instruction corresponding to the load to address A2) is illustrated. LS2 buffer 62 is empty at reference numeral 144.

Processor 2 refetches the discarded instructions, including the load to address A1. At reference numeral 146, the state of LS2 buffer 62 upon probing for the load to address A1 is shown. Accordingly, the miss bit for the load to address A1 is set. Finally, the fill tag matching the MAB tag for the load to address A1 is returned from bus interface unit 37, along with data reflecting processor 1's update to address A1. The correct data is forwarded within processor 2. Subsequent to retiring the load to address A1, LS2 buffer 62 is empty (reference numeral 148).

Self-Modifying Code Checks

Figure 17:
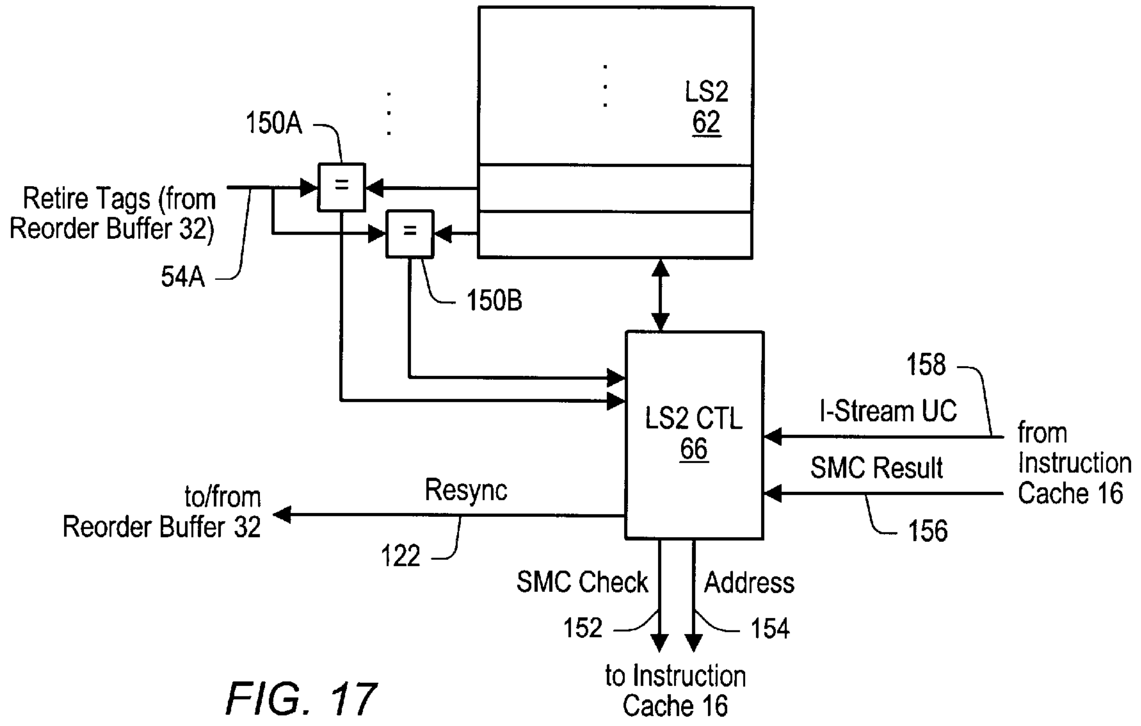
FIG. 17 is a block diagram of a portion of one embodiment of a load/store unit including self-modifying code checking hardware.

Turning now to FIG. 17, a block diagram of one embodiment of a portion of one embodiment of load/store unit 26 is shown. Other embodiments are possible and contemplated. The embodiment shown in FIG. 17 is configured to initiate self-modifying code (SMC) checks for store memory operations. In other words, the embodiment shown is configured to initiate a check to determine if a store memory operation modifies memory locations which have been fetched as instructions and are in-flight within processor 10. The embodiment of FIG. 17 includes LS2 buffer 62, LS2 control logic 66, and a plurality of comparators 150A–150B. Comparators 150A–150B are coupled to receive retire tags from reorder buffer 32 via a retire tags bus 54A (part of retire interface 54), and are coupled to LS2 buffer 62 and LS2 control logic 66. LS2 control logic 66 is further coupled to LS2 buffer 62 and to resync line 122, an SMC check line 152, an address bus 154, an SMC result line 156, and an I-stream UC line 158. Resync line 122 is coupled to reorder buffer 32 and the other interconnect is coupled to instruction cache 16.

Generally speaking, the apparatus described herein attempts to minimize the number of explicit SMC checks performed within processor 10. SMC checks generally involve transmitting the store address to destinations within processor 10 at which information regarding the instructions in-flight within processor 10 is stored. The store address is compared to the instruction addresses of the in-flight instructions to determine if the store updates any of the in-flight instructions. If it is determined that in-flight instructions have been updated, corrective action is taken (e.g. discarding the instructions subsequent to the instruction corresponding to the store in program order and refetching those instructions). Updating of the cache and returning status for the store is delayed until the check is completed, which may take several clock cycles.

More particularly, the apparatus shown attempts to minimize SMC checks for non-cacheable stores. SMC checks for cacheable stores may be minimized, for example, by maintain exclusion between data cache 28 and instruction cache 16. In other words, a particular cache line is allowed to exist in at most one of data cache 28 and instruction cache 16 at any given point in time. By maintaining exclusion, SMC checks for stores which hit in data cache 16 may be skipped because instructions cannot be fetched from the cache line without evicting the cache line from data cache 28 (which would cause the store to be a miss). Therefore, SMC checks may be performed for cacheable stores which miss. Alternatively, an indication may be included within each data cache line to indicate whether or not the cache line is also stored in instruction cache 16. If a store is a miss or a hit for a cache line which is also stored in instruction cache 16, the SMC check is performed. Other embodiments for handling cacheable store SMC checks are contemplated. It is noted that the cacheability of a store may be determined during translation of the store address (which is performed during probing of data cache 28 prior to placing the stores in LS2 buffer 62). For example, in the embodiment described above, the memory type field 96Q may store cacheability information for the store memory operation.

For non-cacheable stores, caching policies are ineffective for minimizing SMC checks since there is no corresponding cache line. However, if the store is non-cacheable, then instruction fetches from the same memory locations are also non-cacheable. Instruction cache 16 tracks the cacheability of the instructions in-flight within processor 10. If one or more in-flight instructions are non-cacheable, then instruction cache 16 asserts an I-stream UC signal on I-stream UC line 158. The asserted I-stream UC signal indicates to load/store unit 26 that at least one non-cacheable instruction is in-flight, while the deasserted I-stream UC signal indicates that each in-flight instruction is cacheable. It is noted that the terms non-cacheable and uncacheable may be used herein. The terms non-cacheable and uncacheable are intended to be synonymous herein and indicate that the memory locations referenced by the store address or instruction address are inhibited from storage within caches.

LS2 control logic 66 determines whether or not to perform SMC checks for a particular store once the particular store is otherwise in condition for updating the affected memory locations (either in data cache 28 or through bus interface unit 37 to other cache levels and/or main memory). In the present embodiment, a store may perform its update in response to being indicated as retireable by reorder buffer 32. Accordingly, comparators 150A–150B are provided. Reorder buffer 32 provides retire tags (instruction tags corresponding to memory operations being retired by reorder buffer 32) to comparators 150A–150B. Comparators 150A–150B compare the retire tags to the instruction tags within each LS2 buffer entry to locate memory operations being retired. Accordingly, the number of comparators may be equal to the number of memory operations which may be concurrently retired by reorder buffer 32 multiplied by the number of entries within LS2 buffer 62. However, for simplicity in the drawing, only comparators 150A–150B have been illustrated. In one embodiment, up to two memory operations may be retired by reorder buffer 32 concurrently.

Comparators 150A–150B signal LS2 control logic 66 if a match is detected between the retire tags and the instruction tag within the corresponding entry. LS2 control logic 66 determines if the identified entries are stores, and if an SMC check is to be performed. If the store is cacheable, LS2 control logic 66 determines whether or not to perform an SMC check as described above. If the store is non-cacheable, an SMC check is performed if the I-stream UC signal is asserted. If an SMC check is not indicated, LS2 control logic 66 returns normal status for the store and marks the store as retired within LS2 buffer 62 (e.g. via the retired bit 96J within the corresponding entry).

If an SMC check is indicated, LS2 control logic 66 initiates an SMC check by asserting an SMC check signal on SMC check line 152 and transmitting the store data address on address bus 154 to instruction cache 16. Instruction cache 16 performs the SMC check, and returns a result upon SMC result line 156. For example, instruction cache 16 may assert a signal indicating that the SMC check is complete and provide a second signal identifying the result as an SMC hit (correction is to be performed) or an SMC miss (correction is not to be performed). If the result is SMC hit, LS2 control logic 66 returns a synchronization indication to reorder buffer 32 via resync line 122. Otherwise, normal status is returned for the store (allowing reorder buffer 32 to retire the corresponding instruction). Reorder buffer 32 may synchronize after the store in a manner similar to mispredicted branches, by discarding the instructions subsequent to the instruction corresponding to the store and refetching the instructions. Since the instructions are fetched after the store has updated the targeted memory locations, the correct instructions are fetched upon refetching.

Figure 18:
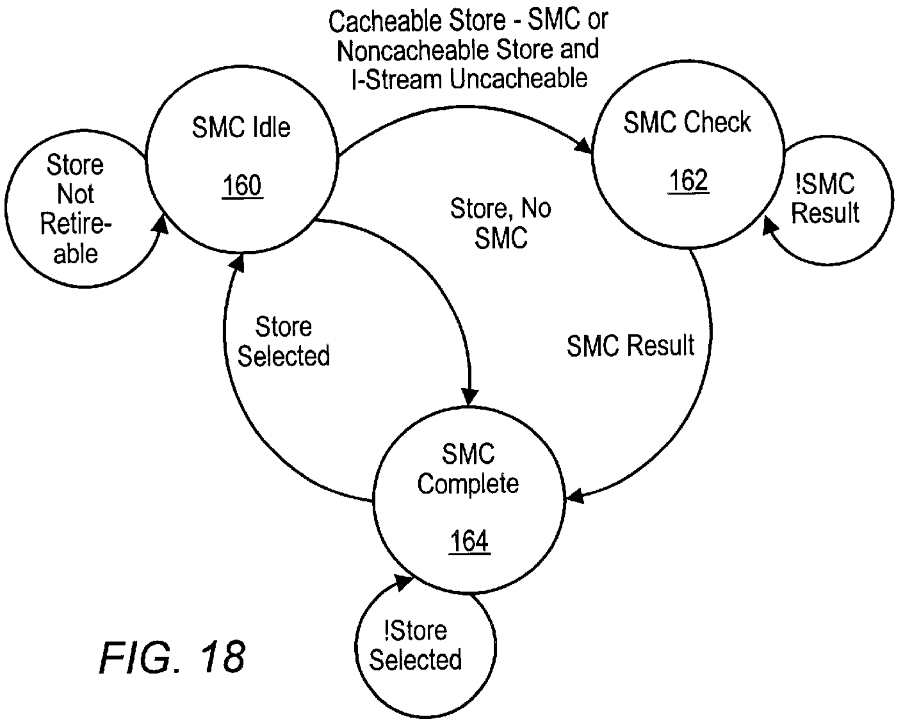
FIG. 18 is a state machine which may be employed by one embodiment of the load/store unit shown in FIG. 17.

It is noted that LS2 control logic 66 may use comparisons between the retire tags and LS2 buffer entries for other purposes as well, depending upon other design considerations. For example, the retire tags may also identify memory operations which have already returned status to reorder buffer 32 and hence are actually being retired by reorder buffer 32. LS2 control logic 66 may delete load hits from LS2 buffer Turning next to FIG. 18, a state machine diagram illustrative of the performance of an SMC check for a store is shown. Other embodiments are possible and contemplated. The embodiment shown in FIG. 18 may be implemented, for example, by storing the current state for each store in the SMC field 96N of the corresponding LS2 buffer entry. The SMC state machine is initially in an SMC idle state 160. The SMC state machine remains in the SMC idle state if the store is not yet retireable (as indicated by receiving a retire tag for the store). Upon receiving an indication that the store is retireable, the SMC state machine transitions to one of two states: SMC check state 162 or SMC complete state 164. SMC check state 162 is selected if the store is a cacheable store for which an SMC check is to be performed or if the store is non-cacheable and the I-stream UC signal is asserted. Additionally, the SMC check signal is asserted and the store address of the store is transmitted to instruction cache 16. On the other hand, the SMC state machine transitions from SMC idle state 160 to SMC complete state 164 if LS2 control logic 66 determines that the store does not require an SMC check. Normal status is returned to reorder buffer 32 in this case, and the store is indicated as retired within the corresponding LS2 buffer entry.

The SMC state machine remains in SMC check state 162 until an SMC result is provided by instruction cache 16. Upon receiving the SMC result, the SMC state machine transitions to SMC complete state 164. Additionally, LS2 control logic 66 returns either a synchronization status or a normal status in response to the SMC result provided.

The SMC state machine remains in SMC complete state 164 until the store is selected for updating the memory locations specified by the store address. Generally, the store will be selected quickly as it is the oldest operation within LS2 buffer 62 (by virtue of being retired). Upon selection, the store is transmitted to data cache 28 for updating if the store is cacheable, or is transmitted to bus interface unit 37 if the store is non-cacheable. The store may then be deleted from LS2 buffer 62, effectively returning the SMC state machine to SMC idle state 160.

Figure 19:
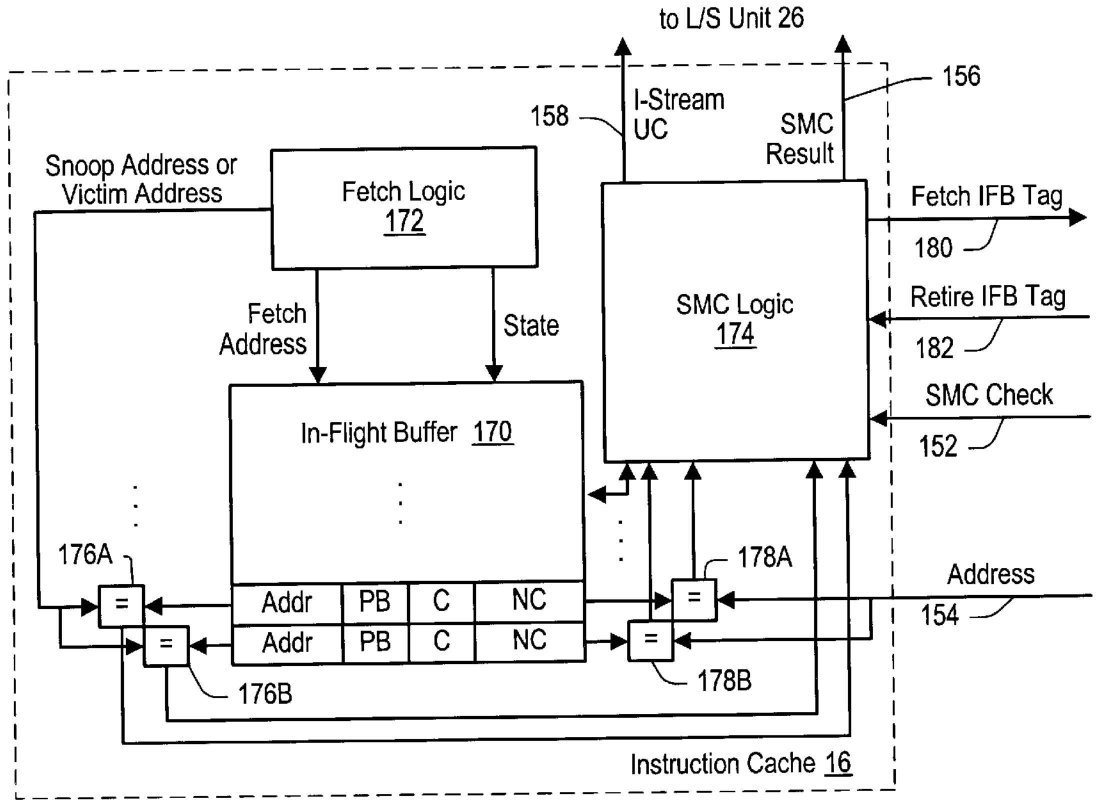
FIG. 19 is a block diagram of a portion of one embodiment of an instruction cache which may be used with the load/store unit shown in FIG. 17.

Turning next to FIG. 19, a block diagram of a portion of instruction cache 16 is shown. For simplicity in the drawing, only portions of instruction cache 16 involved in performing an SMC check for in-flight instructions are shown. Other portions may include the instruction cache storage and control, instruction address translation, etc. Other embodiments are possible and contemplated. In the embodiment of FIG. 19, instruction cache 16 includes an in-flight buffer 170, fetch logic 172, SMC logic 174, snoop/victim comparators 176A–176B, and SMC comparators 178A–178B. Fetch logic 172 is coupled to provide a fetch address which is being fetched from instruction cache 16 (or main memory) and the state of the fetch address to in-flight buffer 170. Instructions become in-flight upon their fetch from instruction cache 16 or main memory into the instruction processing pipeline of processor 10. In-flight buffer 170 is further coupled to SMC logic 174, snoop/victim comparators 176A–176B, and SMC comparators 178A–178B. SMC logic 174 is further coupled to snoop/victim comparators 176A–176B and SMC comparators 178A–178B. Additionally, SMC logic 174 is coupled to receive an SMC check signal on SMC check line 152 and to provide an SMC result signal on SMC result line 156 and an I-stream UC signal on I-stream UC line 158. SMC logic 174 is further coupled to provide a fetch in-flight buffer (IFB) tag to reorder buffer 32 on a fetch IFB tag bus 180 and to receive a retire IFB tag from reorder buffer 32 on a retire IFB tag bus 182. SMC comparators 178A–178B are coupled to receive an SMC address on address bus 154. Snoop/victim comparators 176A–176B are coupled to receive a snoop or victim address from fetch logic 172.

Generally speaking, in-flight buffer 170 stores instruction addresses of in-flight instructions. Additionally, in-flight buffer 170 stores a state corresponding to the instruction addresses. In one embodiment, the state may include prefetch buffer, cache, or not cached. The prefetch buffer state indicates that the instructions are stored in a prefetch buffer employed by instruction cache 16 (not shown). The cache state indicates that the instructions are stored in instruction cache 16. The not cached state indicates that the instructions are not stored in instruction cache 16 (for example, because the instructions are in a non-cacheable area of memory, or because the instructions are a miss in instruction cache 16, or because the instructions were previously a hit in instruction cache 16 but later were removed from instruction cache 16 due to a probe invalidation or other cache replacement). SMC logic 174 allocates an entry within in-flight buffer 170 in response to an instruction address being fetched by fetch logic 172. The entry is identified by an IFB tag which is transmitted through the pipeline to reorder buffer 32 along with the fetched instructions. Reorder buffer 32 records the IFB tag and returns the IFB tag in response to retiring or discarding the instructions corresponding to the IFB tag. SMC logic 174 deletes the corresponding entry within in-flight buffer 170 in response to the retiring IFB tag. Accordingly, the instruction addresses within in-flight buffer 170 represent the in-flight instructions. It is noted that, in one embodiment, reorder buffer 32 may concurrently retire instructions corresponding to more than one IFB tag. In such an embodiment, reorder buffer 32 may provide the youngest IFB tag on retire IFB tag bus 182. SMC logic 174 may delete each entry older than the entry identified by the retiring IFB tag (e.g. at a rate of one entry per clock cycle or any other suitable rate).

SMC logic 174 generates the I-stream UC signal in response to the states of the in-flight instructions. If one or more in-flight instructions are not cached, as indicated by the not-cached states in in-flight buffer 170, SMC logic 174 asserts the I-stream UC signal. If all instructions are cached or in the prefetch buffers, then SMC logic 174 deasserts the I-stream UC signal.

In one embodiment, fetch addresses are recorded on a fetch block granularity. Instruction cache 16 provides a block of contiguous instruction bytes in response to a fetch address (the "fetch block"), which may comprise one or more instructions. The fetch block is passed to instruction scanning and alignment logic as a group (e.g. into an instruction queue or other similar mechanism). In various embodiments, the fetch block may comprise a cache line, or a predefined portion of a cache line, according to design choice. The fetch block is represented by one entry within in-flight buffer 170. The number of entries for in-flight buffer 170 may be determined according to the number of fetch blocks which may be in-flight within processor 10, and therefore may be dependent upon the number of pipeline stages in processor 10, the superscalar issue width, the number of reorder buffer entries, etc. In one specific implementation, 32 entries are provided although any number may be used.

SMC logic 174 performs SMC checks responsive to the SMC check signal provided by load/store unit 26. In parallel with SMC logic 174 receiving the SMC check signal, SMC comparators 178 receive the SMC address. SMC comparators 178 are coupled to corresponding entries within in-flight buffer 170. Accordingly, the number of SMC comparators 178 may be equal to the number of entries within in-flight buffer 170. For simplicity in the drawing, SMC comparators 178A–178B are illustrated. Comparators 178 compare the SMC address to the instruction addresses recorded within in-flight buffer 170. Comparators 178 are configured to compare the addresses exclusive of the bits which define an offset within the fetch block, and hence perform a compare to determine if the SMC address is within the same fetch block as the addresses recorded within in-flight buffer 170. If a match is detected, the corresponding comparator 178 signals SMC logic 174. SMC logic 174 asserts signals on SMC result line 156 to indicate that an SMC hit has been detected if one or more of comparators 178 signals a match and an SMC check is being signalled. On the other hand, if an SMC check is signalled and none of comparators 178 indicate a match, then SMC logic 174 asserts signals on SMC result line 156 to indicate that an SMC miss has been detected.

It is noted that the SMC address may be provided to other portions of instruction cache 16 as well. For example, the SMC address may be provided to instruction cache storage and control, to cause the eviction of a cache line matching the SMC address. Additionally, instruction cache 16 may include one or more miss buffers for cache lines to be transferred from bus interface unit 37, and the SMC check may be performed against the miss buffers as well.

The state of a fetch block provided by fetch logic 172 along with the instruction address represents the state of the fetch block upon fetch thereof. The state may change while the instructions are in-flight, and SMC logic 174 is configured to monitor for such state changes and to update in-flight buffer 170 to reflect the changes. For example, a snoop invalidate request may cause a cache line to be evicted from instruction cache 16. Similarly, instruction cache misses may cause the eviction of a cache line to store the instruction bytes of the missing instruction cache line. Other conditions may cause a cache line to be evicted according to design choice. For example, an embodiment of processor 10 which maintains exclusion between instruction cache 16 and data cache 28 may cause an instruction cache eviction when the cache line is allocated into data cache 28.

Fetch logic 172 provides victim addresses (of cache lines which are being evicted) and snoop addresses to comparators 176A–176B. As with comparators 178, comparators 176 may be provided for each in-flight buffer entry. However, for simplicity in the drawing, comparators 176A–176B are shown. Furthermore, if concurrent comparisons of snoop addresses and victim addresses are desired, separate comparators 176 may be provided for each input address. These addresses are compared (on a cache line basis, which may differ from the fetch block basis) to addresses within in-flight buffer entries. In other words, address bits which provide an offset within the cache line are excluded from the comparison performed by comparators 176. If a comparator 176 detects a match, a corresponding signal is asserted to SMC logic 174. In response, SMC logic 174 changes the state of the identified entry to not cached (which may result in the assertion of the I-stream NC signal, if the I-stream NC signal is deasserted).

It is noted that in-flight buffer may be used for other purposes as well, according to design choice. It if further noted that, in other embodiments, SMC checks may be performed in reorder buffer 32 and pipeline stages prior to reorder buffer 32, as desired.

Figure 20:
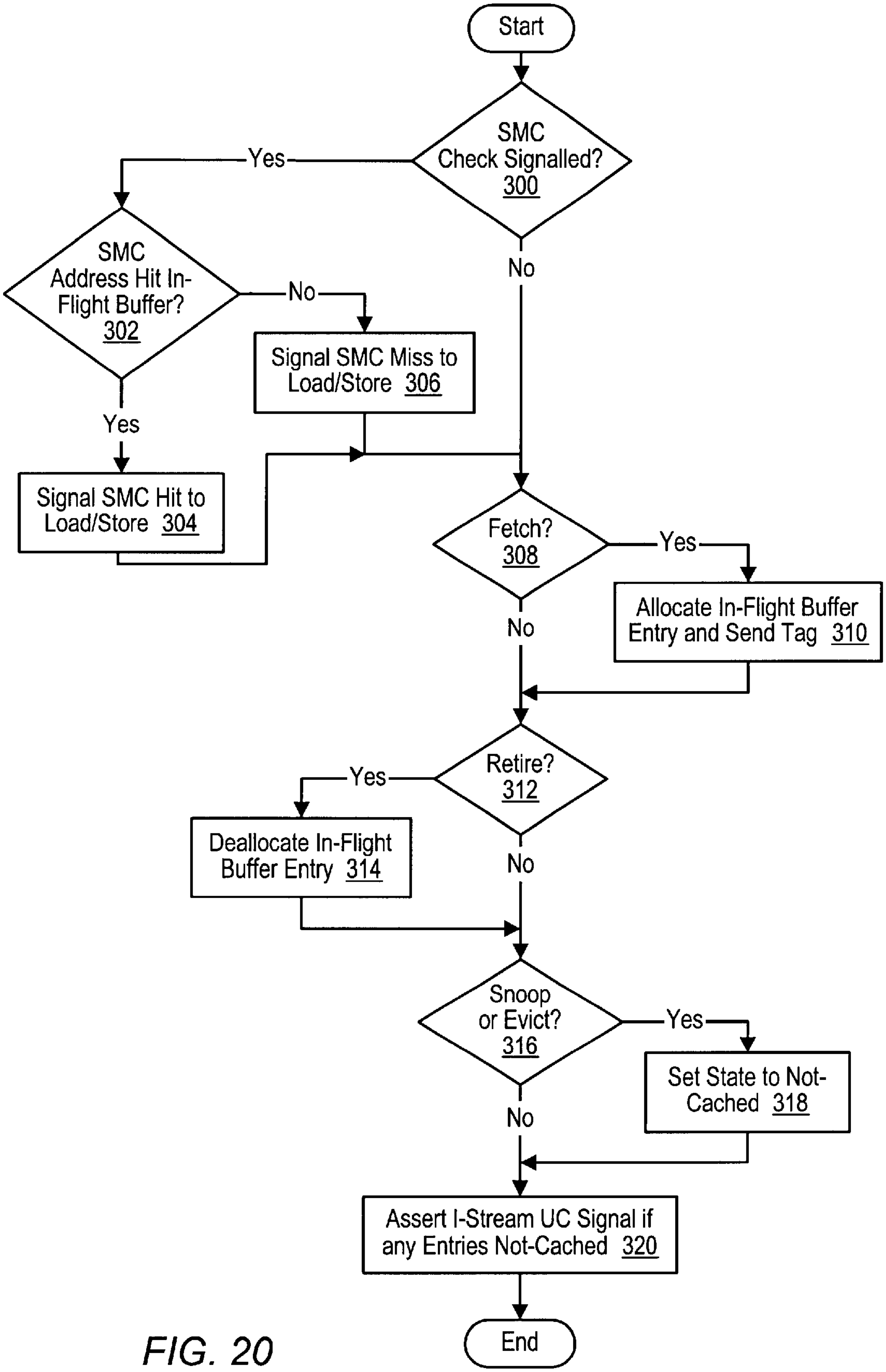
FIG. 20 is a flowchart illustrating operation of one embodiment of self-modifying code check control logic shown in FIG. 10.

Turning now to FIG. 20, a flowchart illustrating operations which may be performed by one embodiment of SMC logic 174 is shown. Other embodiments are possible and contemplated. While the steps shown in FIG. 20 are illustrated in a particular order for ease of understanding, any suitable order may be used. Additionally, steps may be performed in parallel by combinatorial logic within SMC logic 174.

If an SMC check is signalled (decision block 300), SMC logic 174 determines if comparators 178 are indicating an SMC hit (decision block 302). If an SMC hit is detected, SMC logic 174 signals load/store unit 26 that an SMC hit has occurred for the SMC check (step 304). Conversely, if an SMC hit is not detected, SMC logic 174 signals load/store unit 26 that an SMC miss has been detected (step 306).

If a fetch occurs (decision block 308), SMC logic 174 allocates an in-flight buffer entry for the instruction address and transmits an IFB tag corresponding to the entry (step 310). If a retire IFB tag is received (decision block 312), SMC logic 174 deallocates the identified in-flight buffer entry (step 314). If a snoop or eviction is detected by comparators 176 (decision block 316), SMC logic 174 sets the state of the affected entry to not cached (step 318). Finally, SMC logic 174 asserts the I-stream UC signal if one or more in-flight buffer entries are in the not-cached state (step 320).

Exponential Backoff

Figure 21:
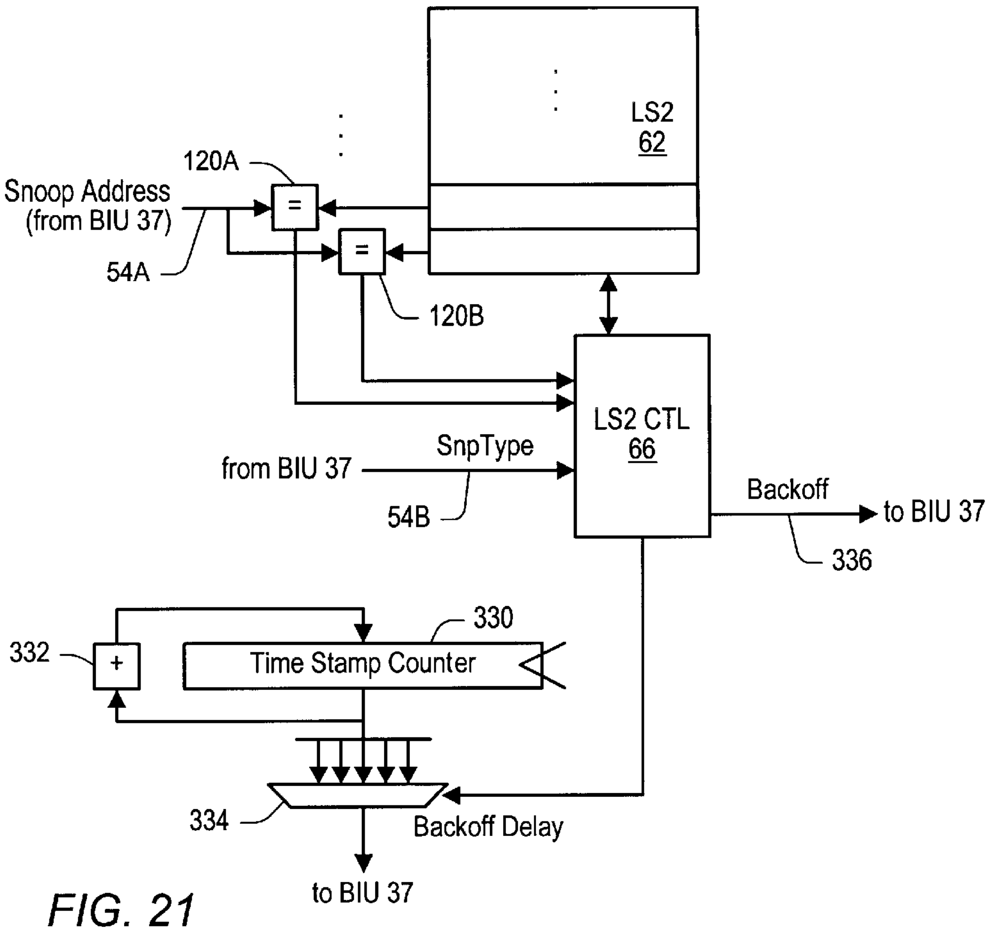
FIG. 21 is a block diagram of a portion of one embodiment of a load/store unit including exponential backoff.

Turning now to FIG. 21, a block diagram of one embodiment of a portion of one embodiment of load/store unit 26 is shown. Other embodiments are possible and contemplated. In the embodiment of FIG. 21, load/store unit 26 includes LS2 buffer 62, LS2 control logic 66, comparators 120A–120B, snoop address bus 54A and snoop type bus 54B. The above elements are coupled together in a manner similar to that described above for the embodiment of FIG. 13. Additionally, the embodiment of FIG. 21 includes a time stamp counter register 330, a time stamp incrementor 332, and a backoff delay mux 334. Time stamp counter register 330 is coupled to time stamp incrementor 332 and to backoff delay mux 334. Backoff delay mux 334 is coupled to receive selection controls from LS2 control logic 66 and to provide a backoff delay signal to bus interface unit 37. LS2 control logic 66 is further coupled to a backoff line 336, which is further coupled to bus interface unit 37.

Generally speaking, load/store unit 26 is configured to avoid deadlock in multiprocessor systems for cases in which two or more processors are attempting to obtain ownership of a particular cache line. Load/store unit 26 may accomplish deadlock avoidance by detecting cases in which a snoop hit to a memory operation within LS2 buffer 62 causes processor 10 to lose sufficient ownership to complete that memory operation. For example, processor 10 loses sufficient ownership to complete a load memory operation if a previously valid cache line accessed by the load is invalidated. On the other hand, processor 10 loses sufficient ownership to complete a store memory operation if a cache line accessed by the store is previously in a state other than invalid or shared and the cache line is changed to invalid or shared in response to a snoop hit. In response to losing sufficient ownership, load/store unit 26 is configured to signal bus interface unit 37 to backoff (via a backoff signal on backoff line 336) and to increase the initial backoff time. The backoff time is increased each time the ownership is gained and then lost before the affected memory operation can be completed. Eventually, the memory operation may be completed (after the other processor successfully completes its memory operation) and the backoff time may be reset to its initial value. The term "backoff time" refers to a time interval during which processors are configured to inhibit attempting to reestablish ownership of a cache line for which ownership was lost via a snoop operation. It is noted that load/store unit 26 may be configured to perform the backoff internally (e.g. by not attempting to transmit commands to bus interface unit 37 for transmittal on the bus).

As described above for the embodiment of FIG. 13, comparators 120 (including comparators 120A–120B and other comparators for other LS2 buffer entries) are configured to compare the snoop address of a snoop operation to the addresses within LS2 buffer 62. If a snoop hit is detected for an entry, LS2 control logic 66 updates the status of that entry to reflect the state that the corresponding cache line is being updated to (in parallel, by data cache 28, in response to the snoop address and snoop type). Additionally, if the new state of the cache line indicates that processor 10 lost sufficient ownership of the cache line to complete the memory operation within LS2 buffer 62, LS2 control logic 66 may be configured to increase the backoff time employed by bus interface unit 37.

In one particular embodiment, LS2 control logic 66 may update store memory operations which are hit by a snoop to indicate that the store memory operations are misses or require a state change from shared to exclusive before they can be completed. Subsequently, these stores may be selected for fetching the corresponding cache line from memory or for performing the state change. After successfully completing these operations, the store may be completed. Additionally, an embodiment may handle load memory operations in a manner similar to the embodiment shown in FIG. 13.

LS2 control logic 66 may limit increasing backoff times to cases in which sufficient ownership is lost for the oldest memory operation within LS2 buffer 62. In this manner, backoff is not increased each time ownership is lost by any memory operation within LS2 buffer 62. If deadlock would otherwise occur for a particular memory operation, that memory operation will eventually become the oldest memory operation in-flight as older memory operations successfully complete. Additionally, such an embodiment may be simpler to implement than other embodiments.

Still further, such an embodiment may successfully prevent deadlock in cases in which an instruction performs a memory operation which is misaligned across a cache line boundary (i.e. the memory operation accesses one or more bytes from a first cache line and one or more bytes from a second, succeeding cache line). Memory operations which are misaligned across a cache line boundary require sufficient ownership of both cache lines to complete. Load/store unit 26 may handle misaligned cases by performing two memory operations derived from the same instruction (one accessing each cache line). Accordingly, backoff may be implemented for the first of the cache lines (when it becomes oldest), preventing processors from swapping ownership of the two cache lines without one processor achieving ownership of both cache lines simultaneously long enough to complete the memory operation.

In the present embodiment, the backoff time employed by bus interface unit 37 may be derived from time stamp counter register 330. Generally, time stamp counter register 330 may be employed by processor 10 to measure time elapsed. In other words, the difference between the values stored in time stamp counter register 330 at two arbitrary points in time reflects the time elapsed between those two points. Time stamp incrementor 332 may, for example, increment time stamp counter register 330 each clock cycle. In another embodiment, time stamp counter register 330 may be incremented in a clock-frequency-independent fashion to correctly reflect real time. For example, time stamp incrementor 332 may receive a signal independent of the clock signals used to clock processor 10, and may increment time stamp counter register 330 once per interval of the received signal.

Backoff delay mux 334, under the control of LS2 control logic 66, is configured to select a backoff delay for use by bus interface unit 37. In one embodiment, backoff delay mux 334 selects a bit from a predetennined range of bits within time stamp counter register 330. The least significant bit within the range specifies the initial and minimum backoff time, and the increased backoff times may be selected by selecting other bits within the range. More particularly, a transition of the selected bit may indicate the expiration of the backoff interval. A transition of a bit is a change in binary state of the bit (i.e. from one to zero or zero to one). Since the least significant bit in the range transitions more often as the value in time stamp counter register 330 is incremented, the least significant bit specifies the minimum backoff time. Other, more significant bits within the range transition at increasingly longer intervals (actually, an exponential increase as increasingly significant bits are selected in the present embodiment).

Accordingly, upon detecting that the backoff time is to be increased, LS2 control logic 66 may control backoff delay mux 334 to select the next significant bit within the range. Generally, the next significant bit within a multi-bit value is the bit adjacent to but more significant than the currently selected bit within the multi-bit value. Accordingly, each time ownership is gained and lost by processor 10, the backoff delay is selected as a more significant bit than the previous selection. The more significant bits within time stamp counter register 330 transition less frequently, and hence the backoff delay is increased.

Upon detecting that the oldest memory operation within LS2 buffer 62 is completed successfully, LS2 control logic 66 signals backoff delay mux 334 to select the least significant bit within the predetermined range, thereby resetting the backoff delay to its initial value.

Figure 22:
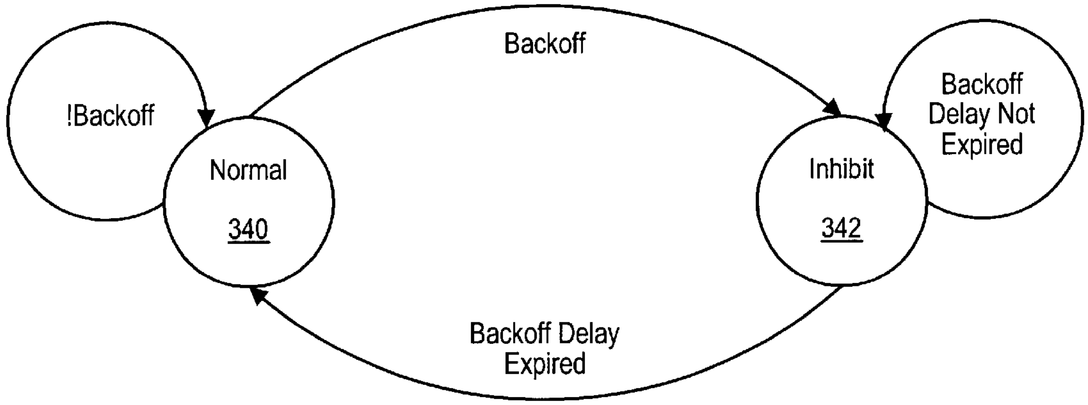
FIG. 22 is a state machine which may be employed by one embodiment of a bus interface unit including exponential backoff.

Turning next to FIG. 22, a backoff state machine illustrative of backing off within one embodiment of bus interface unit 37 is shown. Other embodiments are possible and contemplated. In the embodiment of FIG. 22, the backoff state machine includes a normal state 340 and an inhibit state 342. The backoff state machine is typically in the normal state, and remains in the normal state unless signalled by load/store unit 26 to backoff. While the backoff state machine is in normal state 340, bus interface unit performs transfers of data between instruction cache 16, data cache 28, the L2 cache, and the bus interface. If signalled to backoff, the backoff state machine transitions to inhibit state 342. In inhibit state 342, bus interface unit 37 inhibits initiating transfers of data on the bus interface. Bus interface unit 37 remains in inhibit state 342 until the backoff delay specified by load/store unit 26 expires. Upon expiration of the backoff delay, the backoff state machine returns to normal state 340.

It is noted that, while the above description indicates that bus interface unit 37 inhibits all memory operations while the backoff state machine is in inhibit state 342, other embodiments may allow initiating limited transfers of data. For example, transferring data due to a snoop hit may be initiated during inhibit state 342. Other embodiments may still further allow transfers of data corresponding to memory operations other than the ones for which backoff was detected while in inhibit state 342.

Figure 23:
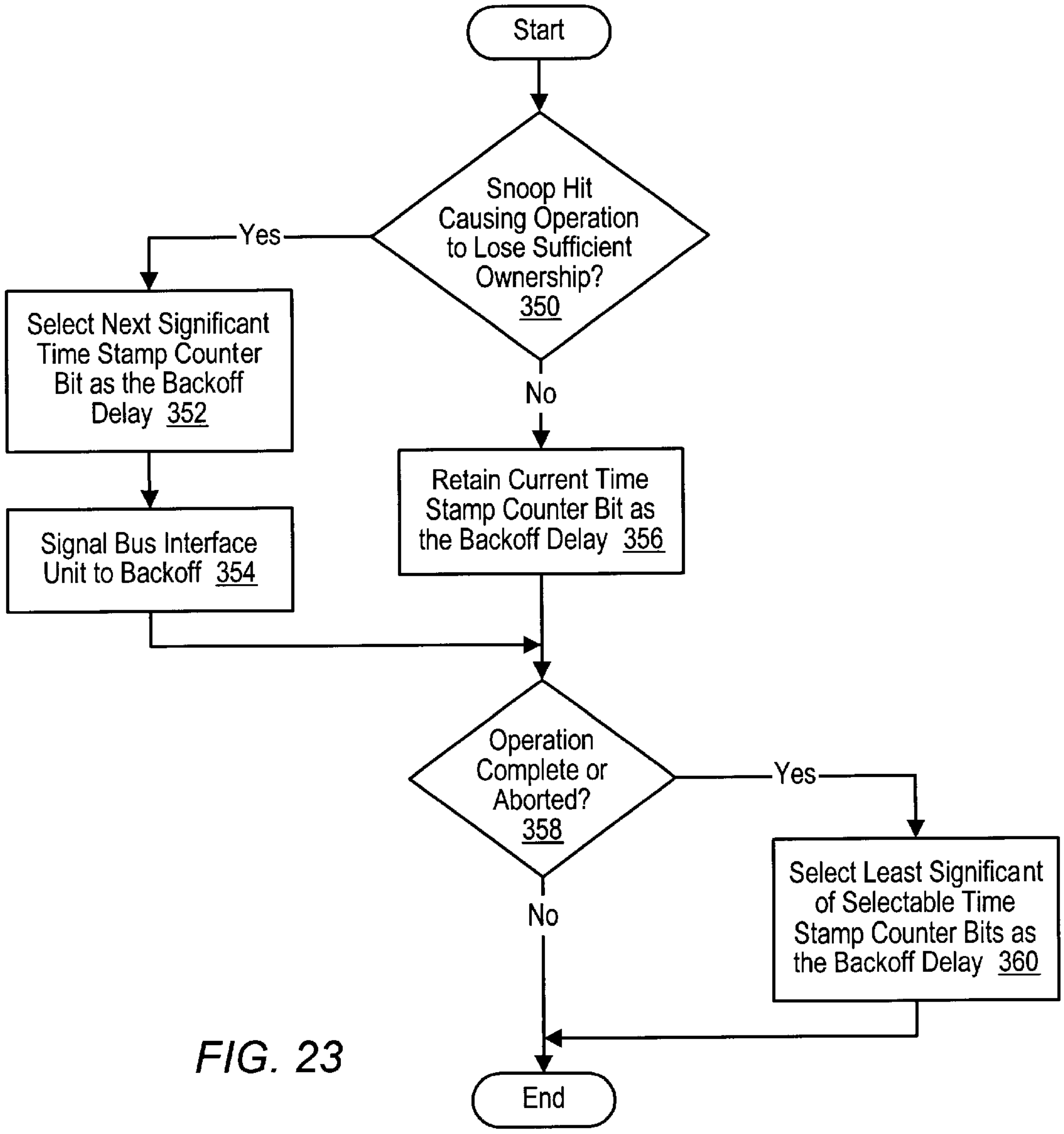
FIG. 23 is a flowchart illustrating operation of one embodiment of control logic illustrated in FIG. 21.

Turning now to FIG. 23, a flowchart is shown illustrating operation of one embodiment of LS2 control logic 66 as shown in FIG. 21. Other embodiments are possible and contemplated. While the steps shown in FIG. 23 are illustrated in a particular order for ease of understanding, any suitable order may be used. Additionally, steps may be performed in parallel by combinatorial logic within LS2 control logic 66.

LS2 control logic 66 determines if a snoop hit is detected for an LS2 buffer entry, and if the snoop hit causes the memory operation in the entry to lose sufficient ownership to complete (decision block 350). If decision block 350 results in a true outcome, LS2 control logic 66 signals backoff delay mux 334 to select the next significant time stamp counter bit as the backoff delay (step 352). Additionally, LS2 control logic 66 assert the backoff signal to bus interface unit 37 (step 354). Conversely, if decision block 350 results in a false outcome, LS2 control logic 66 leaves the currently selected time stamp counter bit as the backoff delay (step 356).

If LS2 control logic 66 determines that the memory operation (for which loss of sufficient ownership lead to increasing the backoff delay) is successfully completed or aborted by processor 10 (decision block 358), LS2 control logic 66 signals backoff delay mux 334 to select the least significant of the selectable time stamp counter bits as the backoff delay (step 360). In other words, the backoff delay is reset to its initial value.

Figure 24:
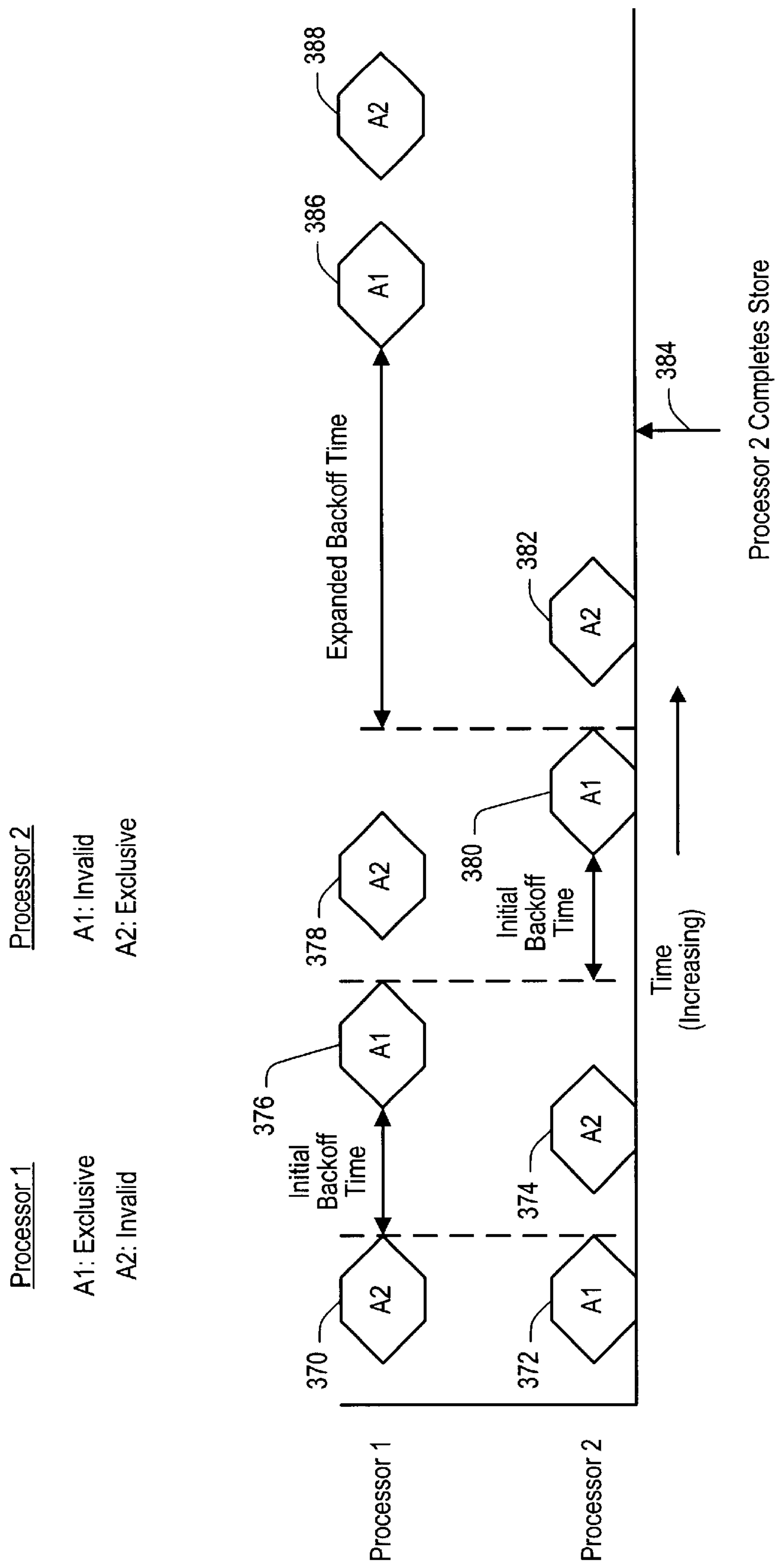
FIG. 24 is a timing diagram illustrating an example of exponential backoff.

Turning next to FIG. 24, a timing diagram is shown illustrating exemplary operation of two processors (processor 1 and processor 2) both attempting to perform a store which is misaligned across cache lines A1 and A2. Prior to initiating the activities shown in FIG. 24, processor 1 has exclusive ownership of cache line A1 and no ownership (invalid) of cache line A2. Processor 2, on the other hand, has no ownership of cache line A1 and exclusive ownership of cache line A2. For purposes of the example, each processor may have the portion of the store to A1 as the oldest entry in LS2 buffer 62 and the portion of the store to A2 as the second oldest entry in LS2 buffer 62.

At approximately the same time, processor 1 initiates an operation to gain write access to cache line A2 (reference numeral 370) and processor 2 initiates an operation to gain write access to cache line A1 (reference numeral 372). For example, each processor may initiate a read operation (to read the cache line of data) with an indication that the data is to be modified (and hence that an exclusive copy is requested). In response to snooping the access by processor 1 to address A2, processor 2 loses ownership of cache line A2. Similarly, in response to snooping the access by processor 2 to address A1, processor 1 loses ownership of cache line A1. Additionally, since the store to address A1 is the oldest entry in LS2 buffer 62, processor 1 initiates a backoff interval using the initial backoff time interval.

While processor 1 is backed off, processor 2 attempts to reestablish ownership of cache line A2 (reference numeral 374). Again, the operation may be a read with modify intent. Processor 1 loses ownership of cache line A1 in response to snooping processor 2's operation. Processor 2 then has exclusive ownership of both cache lines A1 and A2. However, prior to processor 2 completing the store operation, processor 1's backoff interval expires and processor 1 attempts to reestablish ownership of cache line A1 (reference numeral 376). Processor 1 snoops the operation and loses ownership of cache line A1. Additionally, processor 1 enters a backoff interval of the initial length as well.

Similar to processor 2's operation during processor 1's backoff period, processor 1 attempts to reestablish ownership of cache line A1 (reference numeral 378). Processor 1 then has exclusive ownership of both cache lines A1 and A2. However, prior to processor 1 completing the store operation, processor 2's backoff interval expires and processor 2 attempts to reestablish ownership of cache line A1 (reference numeral 380). Processor 1 snoops the operation and loses ownership of cache line A1. Additionally, processor 1 enters a backoff interval of expanded length due to the repeated loss of ownership. During the expanded backoff interval, processor 2 attempts to reestablish ownership of cache line A2 (reference numeral 382). Additionally, due to the additional time available during the expanded backoff interval, processor 2 completes its store (arrow 384).

Subsequently, the expanded backoff interval expires and processor 1 attempts to gain ownership of cache lines A1 and A2 (reference numerals 386 and 388, respectively). Since processor 2 has completed its write operation, processor 2 allows processor 1 to obtain ownership of both cache lines (and provides the updated copies to maintain coherency).

Computer System

Figure 25:
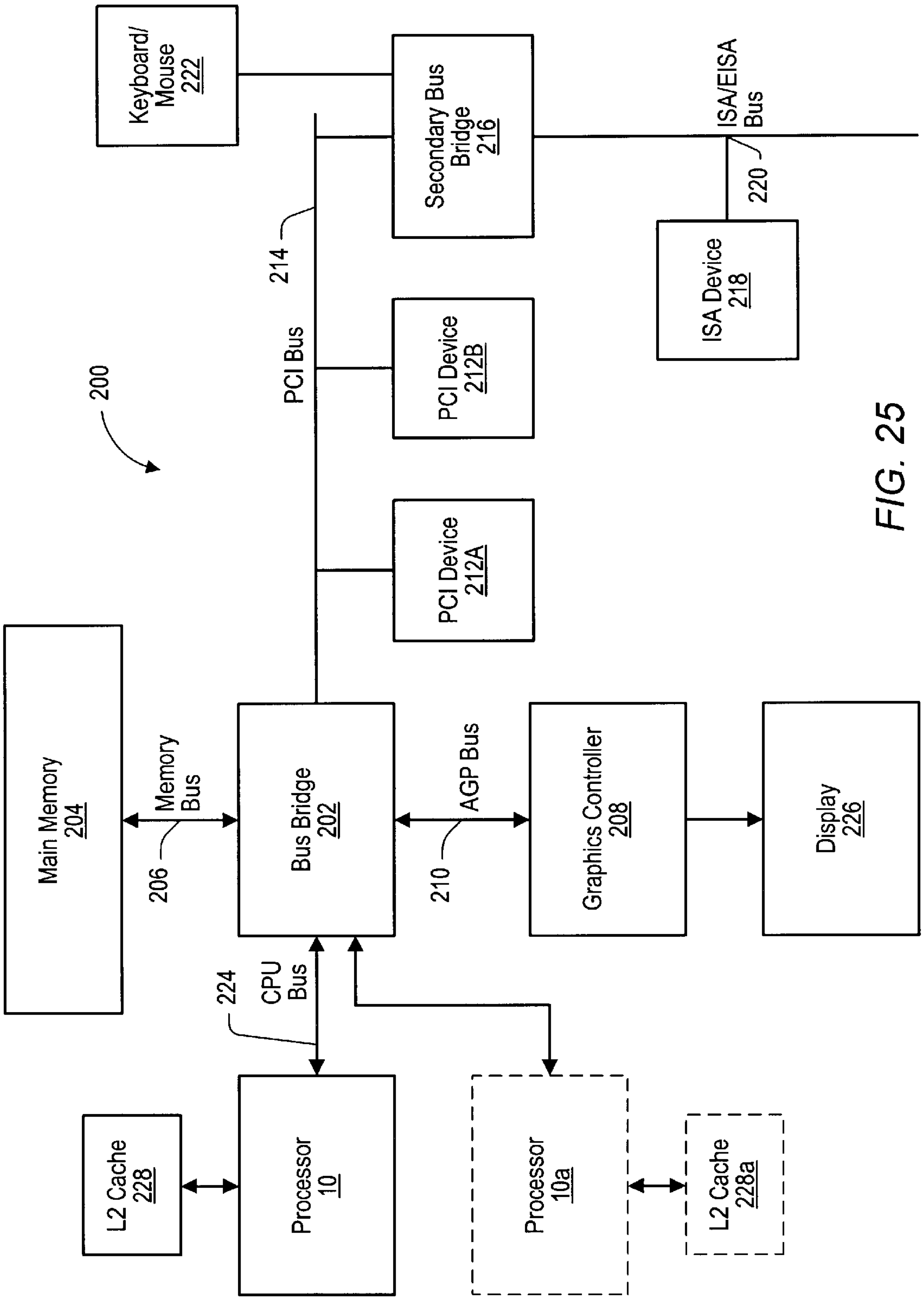
FIG. 25 is a block diagram of one embodiment of a computer system including the processor shown in FIG. 1.

Turning now to FIG. 25, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 25) or may share CPU bus 224 with processor 10. Furthermore, processor 10*a* may be coupled to an optional L2 cache 228*a* similar to L2 cache 228.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

It is noted that, while a variety of embodiments described above showed comparators coupled to buffers for comparing values within the buffers to input values, these buffers may equivalently be implemented as content addressable memories (CAMs), at least for the portions of the entries being compared, as desired. It is further noted that various embodiments above may be used separately from other embodiments, or may be used in combination with one or more other embodiments, as desired. Furthermore, an embodiment combining the operation of all the above embodiments is contemplated.

Numerous variations and modifications will become apparent to those skilled in the art once the above disclosure is fully appreciated. It is intended that the following claims be interpreted to embrace all such variations and modifications.

What is claimed is:

1. A processor comprising:

a load/store unit including:

a buffer configured to store a store memory operation and a corresponding cacheability indication; and a control logic configured to set said cacheability indication according to a translation of a store address corresponding to said store memory operation, and wherein said control logic is coupled to receive a signal indicative of whether one or more instructions in-flight within said processor are uncacheable, and wherein said control logic is configured to inhibit a self-modifying code (SMC) check for said store memory operation responsive to: (i) said cacheability indication indicating non-cacheable; and (ii) said signal indicating cacheable.

2. The processor as recited in claim 1 wherein said control logic is configured to initiate said SMC check for said store memory operation responsive to: (i) said cacheability indication indicating non-cacheable; and (ii) said signal indicating uncacheable.

3. The processor as recited in claim 1 further comprising an instruction cache configured to generate said signal.

4. The processor as recited in claim 3 wherein said instruction cache comprises a second buffer configured to store instruction addresses of instructions in-flight within said processor.

5. The processor as recited in claim 4 wherein said second buffer is configured to store said addresses on a fetch block basis.

6. The processor as recited in claim 4 wherein said second buffer is configured to store a cache state for each instruction address.

7. The processor as recited in claim 6 wherein said state comprises prefetch buffer, cached, and not-cached.

8. The processor as recited in claim 7 wherein said instruction cache is configured to assert said signal to indicate uncacheable if a state corresponding to any instruction address within said second buffer comprises not-cached.

9. The processor as recited in claim 4 wherein each of said instruction addresses is logged into said second buffer in response to a fetch of one or more instructions at said each of said instruction addresses from said instruction cache.

10. The processor as recited in claim 9 further comprising a reorder buffer, wherein said each of said addresses is deleted upon retirement, from said reorder buffer, of each of said one or more instructions.

11. The processor as recited in claim 1 further comprising a reorder buffer, wherein said reorder buffer is configured to convey an indication to said load/store unit that said store memory operation is retirable, and wherein said load/store unit is configured to initiate said SMC check in response to said indication.

12. The processor as recited in claim 11 wherein said load/store unit is configured to return a synchronization indication to said reorder buffer if said SMC check indicates a match between a store address corresponding to said store memory operation and an instruction address of one or more instructions in-flight within said processor.

13. The processor as recited in claim 12 wherein said reorder buffer is configured, in response to said synchronization indication, to purge instructions subsequent to an instruction corresponding to said store memory operation and to refetch purged instructions subsequent to said store memory operation committing to said data cache.

14. A computer system comprising:

a processor including:

a load/store unit including (i) a buffer configured to store a store memory operation and a corresponding cacheability indication; and (ii) a control logic configured to set said cacheability indication according to a translation of a store address corresponding to said store memory operation, and wherein said control logic is coupled to receive a signal indicative of whether one or more instructions in-flight within said processor are uncacheable, and wherein said control logic is configured to inhibit a self-modifying code (SMC) check for said store memory operation responsive to: (i) said cacheability indication indicating non-cacheable; and (ii) said signal indicating cacheable; and a peripheral device for providing communication between said computer system and another computer system to which said peripheral device is coupled.

15. The computer system as recited in claim 14 wherein said peripheral device comprises a modem.

16. The computer system as recited in claim 14 further comprising a second processor coupled in parallel with said processor.

17. A method for performing self-modifying code (SMC) checks in a processor, the method comprising:

determining that a store memory operation is non-cacheable;

asserting a signal if one or more instructions in-flight within said processor are non-cacheable; and inhibiting an SMC check for said store memory operation if said store memory operation is non-cacheable and said signal is deasserted.

18. The method as recited in claim 17 further comprising initiating said SMC check if said store memory operation is non-cacheable and said signal is asserted.

19. The method as recited in claim 17 further comprising synchronizing subsequent to said store memory operation if said SMC check indicates a match between a store address corresponding to said store memory operation and an instruction address of one or more instructions in-flight within said processor.

20. An apparatus comprising:

a buffer configured to store a store memory operation and a corresponding cacheability indication; and a control logic coupled to the buffer and to receive a signal indicative of whether one or more instructions in-flight within said processor are uncacheable, and wherein said control logic is configured to inhibit a self-modifying code (SMC) check for said store memory operation responsive to: (i) said cacheability indication indicating non-cacheable; and (ii) said signal indicating cacheable.

21. The apparatus as recited in claim 20 wherein the control logic is further configured to set said cacheability indication according to a translation of a store address corresponding to said store memory operation.

22. The apparatus as recited in claim 20 wherein said control logic is configured to initiate said SMC check for said store memory operation responsive to: (i) said cacheability indication indicating non-cacheable; and (ii) said signal indicating uncacheable.

23. The apparatus as recited in claim 20 further comprising a second buffer configured to store instruction addresses of instructions in-flight within said processor.

24. The apparatus as recited in claim 23 wherein said second buffer is configured to store said addresses on a fetch block basis.

25. The apparatus as recited in claim 23 wherein said second buffer is configured to store a cache state for each instruction address.

26. The apparatus as recited in claim 25 wherein said state comprises one of at least cached and not-cached.

27. The apparatus as recited in claim 26 further comprising a second control logic coupled to the second buffer, wherein said second control logic is configured to assert said signal to indicate uncacheable if a state corresponding to any instruction address within said second buffer comprises not-cached.

28. The apparatus as recited in claim 27 wherein each of said instruction addresses is logged into said second buffer in response to a fetch of one or more instructions at said each of said instruction addresses from an instruction cache.

29. The apparatus as recited in claim 28 further comprising a reorder buffer, wherein said each of said addresses is deleted upon retirement, from said reorder buffer, of each of said one or more instructions.

30. The apparatus as recited in claim 20 further comprising a reorder buffer, wherein said reorder buffer is configured to convey an indication to said control logic that said store memory operation is retirable, and wherein said control logic is configured to initiate said SMC check in response to said indication.

31. The apparatus as recited in claim 30 wherein said control logic is configured to return a synchronization indication to said reorder buffer if said SMC check indicates a match between a store address corresponding to said store memory operation and an instruction address of one or more instructions in-flight within said processor.

32. The apparatus as recited in claim 31 wherein said reorder buffer is configured, in response to said synchronization indication, to purge instructions subsequent to an instruction corresponding to said store memory operation and to refetch purged instructions subsequent to said store memory operation committing.

33. A method for performing self-modifying code (SMC) checks in a processor, the method comprising:

determining that a store memory operation is non-cacheable;

determining whether or not one or more in-flight instructions are non-cacheable; and inhibiting an SMC check for said store memory operation if said store memory operation is non-cacheable and said in-flight instructions are cacheable.

34. The method as recited in claim 33 further comprising initiating said SMC check if said store memory operation is non-cacheable and at least one of said in-flight instructions are non-cacheable.

35. The method as recited in claim 34 further comprising synchronizing subsequent to said store memory operation if said SMC check indicates a match between a store address corresponding to said store memory operation and an instruction address of one or more of said in-flight instructions.

* * * * *